US010768347B2

(12) United States Patent
Miyazaki et al.

(10) Patent No.: US 10,768,347 B2
(45) Date of Patent: Sep. 8, 2020

(54) DIFFRACTIVE OPTICAL ELEMENT AND LIGHT IRRADIATION DEVICE

(71) Applicant: DAI NIPPON PRINTING CO., LTD., Tokyo (JP)

(72) Inventors: Yuichi Miyazaki, Tokyo (JP); Nobuhito Toyama, Tokyo (JP); Hidenori Yoshioka, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 100 days.

(21) Appl. No.: 16/318,584

(22) PCT Filed: Jul. 21, 2017

(86) PCT No.: PCT/JP2017/026507
§ 371 (c)(1),
(2) Date: Jan. 17, 2019

(87) PCT Pub. No.: WO2018/016633
PCT Pub. Date: Jan. 25, 2018

(65) Prior Publication Data
US 2019/0285781 A1 Sep. 19, 2019

(30) Foreign Application Priority Data
Jul. 22, 2016 (JP) .................................. 2016-143983

(51) Int. Cl.
*G02B 5/18* (2006.01)
(52) U.S. Cl.
CPC .............. *G02B 5/18* (2013.01); *G02B 5/1866* (2013.01)

(58) Field of Classification Search
CPC ...... G02B 5/1847; G02B 5/18; G02B 5/1876; G02B 5/1866
See application file for complete search history.

(56) References Cited

U.S. PATENT DOCUMENTS 5,995,285 A 11/1999 Unno
6,292,297 B1 9/2001 Danziger et al.
(Continued)

FOREIGN PATENT DOCUMENTS

JP H10-020106 A 1/1998
JP H11-512835 A 11/1999
(Continued)

OTHER PUBLICATIONS

Oct. 10, 2017 International Search Report issued in International Patent Application No. PCT/JP2017/026507.

*Primary Examiner* — Wen Huang
(74) *Attorney, Agent, or Firm* — Oliff PLC

(57) ABSTRACT

A diffractive optical element and a light irradiation device which have high optical utilization efficiency, in which, even if the incidence angle of light deviates, the influence on diffracted light is small and desired diffracted light can be stably obtained, and which have little unevenness in diffracted light. A diffractive optical element is provided with a diffractive layer having in a sectional shape a high refractive index part in which a plurality of protruding portions are arranged side by side, and a low refractive index part and including a recessed section formed at least between the protruding portions. The protruding portion has a multistep shape provided with a plurality of step areas having different heights on at least one side of a cross-section thereof, and the cross-section of the protruding portion is at least partially provided with an inclined portion.

18 Claims, 26 Drawing Sheets

(56) References Cited

U.S. PATENT DOCUMENTS

| 9,985,051 B2* | 5/2018 | Tan ........................ G02F 1/133 |
| 2012/0182628 A1 | 7/2012 | Ishii et al. |
| 2015/0252980 A1 | 9/2015 | Maeda et al. |

FOREIGN PATENT DOCUMENTS

| JP | 2002-169011 A | 6/2002 |
| JP | 2006-227503 A | 8/2006 |
| JP | 5740797 B2 | 7/2015 |
| JP | 2015-170320 A | 9/2015 |

* cited by examiner

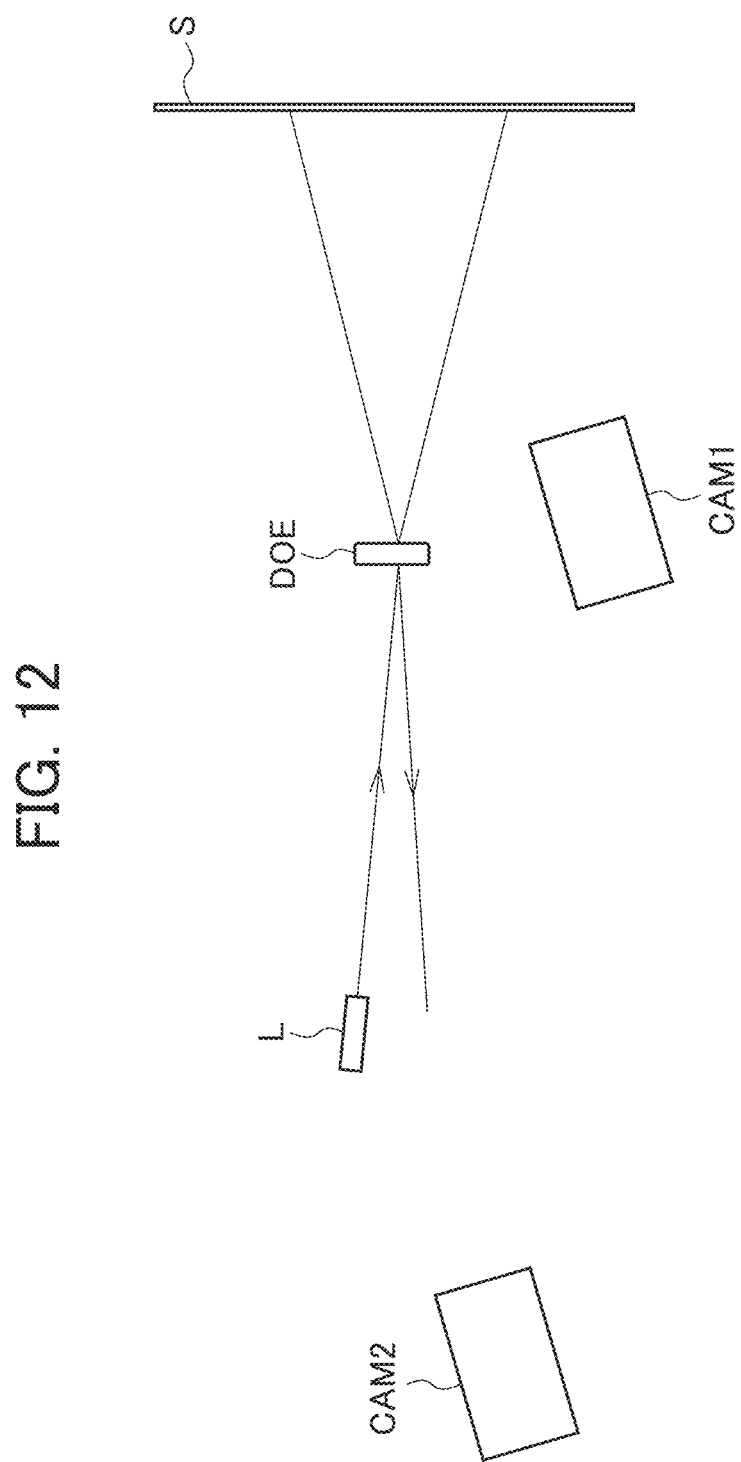

DIFFRACTIVE OPTICAL ELEMENT AND LIGHT IRRADIATION DEVICE

TECHNICAL FIELD

The present invention relates to a diffractive optical element and a light irradiation device.

BACKGROUND ART

In recent years, the need for a sensor system has increased due to requirement for personal authentication to avoid security risks involved with the spread of networks, the trend of automatic operation of automobiles, or the spread of so-called "Internet of Things." There are various types of sensors and various types of information to be detected. As one means, there is a method of irradiating an object with light from a light source and obtaining information from reflected light. For example, a pattern authentication sensor, an infrared radar, and the like are examples of the sensors.

As a light source for each sensor, one having wavelength distribution, brightness, and spread corresponding to the application is used. As the wavelength of light, visible light to infrared rays are often used, and in particular, since the infrared rays have such characteristics that the infrared rays are not easily influenced by external light, are invisible, and are able to observe somewhat inside an object, the infrared rays are widely used. In addition, as the type of the light source, an LED light source, a laser light source, or the like is often used. For example, a laser light source with less spread of light is suitably used for detecting a distant place, whereas an LED light source is suitably used for the case of detecting a relatively near place or for irradiating an area having a certain degree of spread.

By the way, the size and shape of the irradiation area as a target are not necessarily coincident with the spread (profile) of light from the light source, and in that case, it is necessary to shape the light with a diffusion plate, a lens, a shielding plate, or the like. Recently, a diffusion plate, called a Light Shading Diffuser (LSD), which is capable of shaping light to some extent, has been developed.

In addition, a Diffractive Optical Element (DOE) may be another example of means for shaping light. It is an application of a diffraction phenomenon, which occurs when light passes through a place where materials with different refractive indices are arranged periodically, to such an element. The DOE is designed basically for light having a single wavelength. However theoretically, it is possible that the DOE shapes light into an almost desired shape. In addition, in the above-described LSD, the light intensity within the irradiation area has a Gaussian distribution, whereas in the DOE, uniformity of the light distribution within the irradiation area can be controlled. Such characteristics of the DOE are advantageous in terms of high efficiency resulting from suppressing irradiation of unnecessary areas and miniaturization of devices due to reduction in the number of light sources, and the like (refer to, for example, Patent Document 1).

In addition, the DOE is compatible with any of parallel light sources such as lasers and diffusion light sources such as LEDs. The DOE may also be applied to a wide range of wavelengths from ultraviolet light, visible light to infrared light.

The DOE requires microfabrication in the order of nm, and in particular, in order to diffract light having a long wavelength, it has been necessary to form a fine shape with a high aspect ratio. For this reason, an electron beam lithography technique using an electron beam has been conventionally used for manufacturing the DOE. For example, a desired DOE can be obtained by depositing a hard mask or a resist on a quartz plate that is transparent in a range of the ultraviolet light to near infrared light, after that, drawing a predetermined shape on the resist by using an electron beam, performing resist development, dry etching of the hard mask, and dry etching of the quartz to form a pattern on the surface of the quartz plate, and after that, removing the hard mask.

Patent Document 1: Japanese Unexamined Patent Application, Publication No. 2015-170320

DISCLOSURE OF THE INVENTION

Problems to be Solved by the Invention

Although the DOE can efficiently shape light, interfacial reflection occurs due to an abrupt change in a refractive index at the interface between the DOE and the air (or the interface between the DOE and a material having a different refractive index). This interfacial reflection lowers the optical utilization efficiency.

In order to avoid the interfacial reflection, for example, it may be possible to adopt a method of forming an anti-reflection film such as a dielectric multilayer film, but the method may lead generally in many cases to an increase in cost. In addition, it was often difficult to uniformly form the anti-reflection film along the fine shape of the DOE.

In addition, in general, the DOE is designed to perform desired shaping on incident light from a certain direction. In the case of using a laser light source, it is often the case with the light entering vertically on the DOE plane (the surface on which the periodic structure of the DOE exists or the back surface thereof). In addition, in the case of using a diffuse light source such as an LED, the DOE is designed considering that light is incident obliquely on the DOE plane (the plane including the periodic structure of the diffraction grating) based upon the diffusion profile of the light source.

However, in the actual use of the DOE, light is not always incident at a designed angle according to the diffusion profile. Accordingly, the incidence angle may change due to the influence of the assembling accuracy of the device, performance fluctuation of the light source, and the like. In the DOE in the related art, if the incidence angle deviates from the designed angle, the characteristics (for example, light distribution characteristics) of the diffracted light (emitted light) have tended to change greatly. For this reason, the design margins of the DOE and the light irradiation device equipped with the DOE tend to be small. There has been a concern that it is difficult to make the DOE practicable and the light irradiation device becomes expensive.

In addition, in order to improve the light distribution efficiency of the DOE, the sectional shape may be formed in a multistep shape. This increases the light distribution accuracy by controlling the direction of light diffraction. However, there is a limit to the processing accuracy in the step of processing the multistep shape in a case where such high accuracy is required, and a variation in size of the multistep shape occurs. In some cases, unevenness may also occur in the shaped diffracted light due to variations in size of the multistep shape.

The present invention is to provide a diffractive optical element and a light irradiation device which have high optical utilization efficiency, in which, even if the incidence angle of light deviates, the influence on diffracted light is small and desired diffracted light can be stably obtained, and which have little unevenness in diffracted light.

Means for Solving the Problems

The present invention solves the above problems by the following means for solving. In addition, for the better understanding, reference symbols corresponding to embodiments of the present invention are attached, but the present invention is not limited thereto.

A first invention is a diffractive optical element (10, 20, 30, 40) for shaping light, including a diffractive layer (15, 25, 35, 45) including: a high refractive index part (11, 21, 31, 41) in which a plurality of protruding portions (shapes of 11*a*, 21*a*, 31*a*, 41*a*, and the like) are arranged side by side in a sectional shape; and a low refractive index part (14) having a recessed section formed at least between the protruding portions (shapes of 11*a*, 21*a*, 31*a*, 41*a*, and the like), a refractive index of the recessed section being lower than a refractive index of the high refractive index part (11, 21, 31, 41). The diffractive optical element has the features: the protruding portion (11*a*, 21*a*, 31*a*, 41*a*) has a multistep shape including a plurality of step areas (11*a*-1, 11*a*-2, 11*a*-3, 11*a*-4, 21*a*-1, 21*a*-2, 21*a*-3, 21*a*-4, 31*a*-1, 31*a*-2, 31*a*-3, 31*a*-4, 41*a*-1, 41*a*-2, 41*a*-3, 41*a*-4) having different heights from each other on at least one side of a cross-section of each protruding portion; and at least a portion of the cross-section of each protruding portion (11*a*, 21*a*, 31*a*, 41*a*) includes an inclined portion (11*b*, 11*c*, 11*d*, 21*b*, 21*c*, 21*d*, 31*b*, 31*c*, 31*d*, 41*b*, 41*c*, 41*d*) inclined with respect to a plane including the diffractive layer (15, 25, 35, 45).

A diffractive optical element (10, 20, 30, 40) of a second invention includes features: in the diffractive optical element (10, 20, 30, 40) according to the first invention, the cross-section of each protruding portion (11*a*, 21*a*, 31*a*, 41*a*) includes a first inclined portion (11*b*, 21*b*, 31*b*, 41*b*) that is inclined in a direction in which a width of each protruding portion (11*a*, 21*a*, 31*a*, 41*a*) increases from a distal end portion toward a base portion (11*f*, 21*f*, 31*f*, 41*f*) of each protruding portion (11*a*, 21*a*, 31*a*, 41*a*).

A diffractive optical element of a third invention includes features: in the diffractive optical element according to the second invention, the diffractive optical element includes a vertical portion extending in a direction perpendicular to the diffractive layer (15, 25, 35, 45) from the first inclined portion (11*b*, 21*b*, 31*b*, 41*b*) toward the base portion (11*f*, 21*f*, 31*f*, 41*f*).

A diffractive optical element (10, 20, 30, 40) of a fourth invention includes features: in the diffractive optical element (10, 20, 30, 40) according to the second invention, the diffractive optical element (10, 20, 30, 40) includes a second inclined portion (11*c*, 21*c*, 31*c*, 41*c*) inclined in a direction in which the width of each protruding portion (11*a*, 21*a*, 31*a*, 41*a*) decreases from the first inclined portion (11*b*, 21*b*, 31*b*, 41*b*) toward the base portion (11*f*, 21*f*, 31*f*, 41*f*); and a third inclined portion (11*d*, 21*d*, 31*d*, 41*d*) inclined in a direction in which the width of each protruding portion (11*a*, 21*a*, 31*a*, 41*a*) increases from the second inclined portion (11*c*, 21*c*, 31*c*, 41*c*) toward the base portion (11*f*, 21*f*, 31*f*, 41*f*).

A diffractive optical element of a fifth invention includes features: in the diffractive optical element according to the fourth invention, a width of a constricted portion in which the second inclined portion (11*c*, 21*c*, 31*c*, 41*c*) and the third inclined portion (11*d*, 21*d*, 31*d*, 41*d*) are connected to each other is larger than a width of a top portion (11*e*, 21*e*, 31*e*, 41*e*) of the step area when viewed as the width of one step area.

A diffractive optical element (10, 30, 40) of a sixth invention includes features: in the diffractive optical element (10, 30, 40) according to any one of the first to fifth inventions, at least one of ridges (11*j*, 11*k*, 31*j*, 31*k*, 41*k*) of the multistep shape is inclined smoothly.

A diffractive optical element (10, 20, 30, 40) of a seventh invention includes features: in the diffractive optical element (10, 20, 30, 40) according to any one of the first to sixth inventions, the diffractive optical element (10, 20, 30, 40) includes an acute angle portion (11*g*, 11*h*, 21*h*, 21*i*, 31*i*, 41*i*) formed to protrude at an acute angle or to be depressed at an acute angle with a width smaller than a width of each step area in at least one of boundaries of the adjacent step areas of the multistep shape.

A diffractive optical element (10, 20, 30, 40) of an eighth invention includes features: in the diffractive optical element (10, 20, 30, 40) according to any one of the first to seventh inventions, the high refractive index part (11, 21, 31, 41) is one obtained by curing an ionizing radiation curable resin composition.

A diffractive optical element (10, 20, 30, 40) of a ninth invention includes features: in the diffractive optical element (10, 20, 30, 40) according to any one of the first to eighth inventions, the low refractive index part (14) is air.

A diffractive optical element (10) of a tenth invention includes features: in the diffractive optical element (10) according to any one of the first to ninth inventions, a transparent substrate (61), the diffractive layer (15, 25, 35, 45), and a covering layer (62, 63) covering the diffractive layer (15, 25, 35, 45) are stacked in this order.

A diffractive optical element (10, 20, 30, 40) of an eleventh invention includes features: in the diffractive optical element (10, 20, 30, 40) according to any one of the first to tenth inventions, the diffractive layer (15, 25, 35, 45) diffracts infrared rays having a wavelength of 780 nm or more.

A diffractive optical element (10, 20, 30, 40) of a twelfth invention includes features: in the diffractive optical element (10, 20, 30, 40) according to the eleventh invention, a height of the protruding portion (11*a*, 21*a*, 31*a*, 41*a*) is 650 nm or more.

A light irradiation device of a thirteenth invention includes: a light source (L); and the diffractive optical element (10, 20, 30, 40) according to any one of the first to twelfth inventions, in which at least one diffractive optical element is arranged at a position through which light emitted by the light source (L) passes.

A light irradiation device of a fourteenth invention includes features: in the light irradiation device according to the thirteenth invention, the light source (L) can emit infrared rays having a wavelength of 780 nm or more.

Effects of the Invention

According to the present invention, it is possible to provide a diffractive optical element and a light irradiation device which have high optical utilization efficiency, in which, even if the incidence angle of light deviates, the influence of deviation on diffracted light is small and desired diffracted light can be stably obtained, and which have little unevenness in diffracted light.

BRIEF DESCRIPTION OF THE DRAWINGS

FIG. 4 is an enlarged view illustrating a protruding portion 11a.

FIG. 6 is an enlarged view illustrating a protruding portion 21a.

FIG. 8 is an enlarged view illustrating a protruding portion 31a.

FIG. 10 is an enlarged view illustrating a protruding portion 41a.

FIG. 11 is a cross-sectional view illustrating a diffractive optical element of Comparative Example similarly to FIG. 3 and the like.

FIG. 12 is a view illustrating a setup of evaluation.

FIG. 19 is an enlarged view illustrating a protruding portion 71a.

PREFERRED MODE FOR CARRYING OUT THE INVENTION

Hereinafter, best modes for carrying out the present invention will be described with reference to the drawings and the like.

First Embodiment

Figure 1:
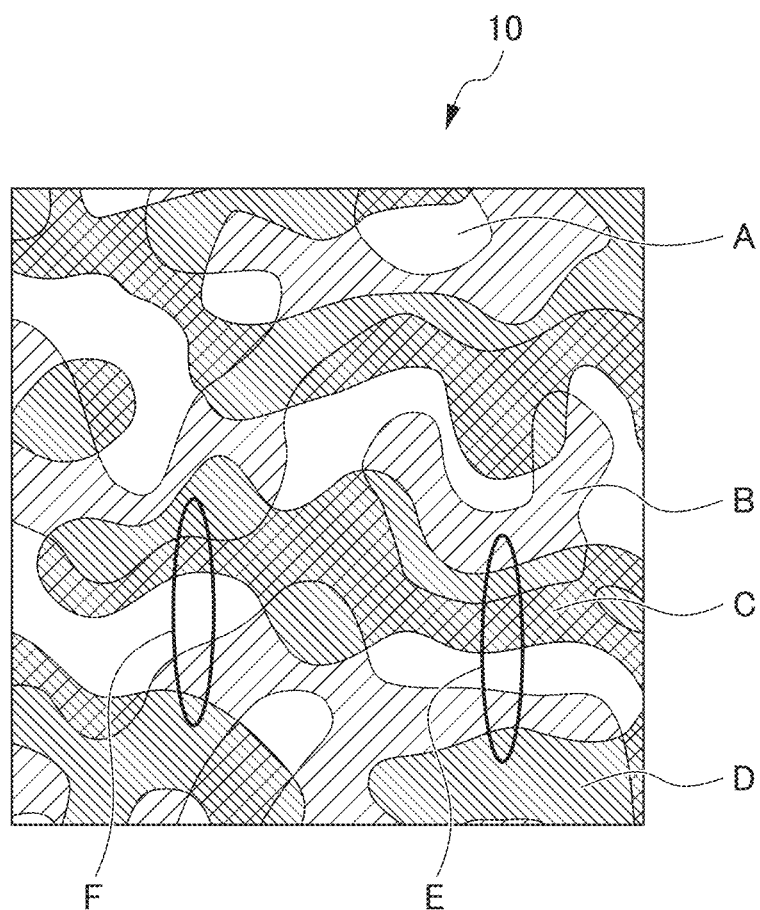
FIG. 1 is a plan view illustrating a first embodiment of a diffractive optical element according to the present invention.

FIG. 1 is a plan view illustrating a first embodiment of a diffractive optical element according to the present invention.

Figure 2:
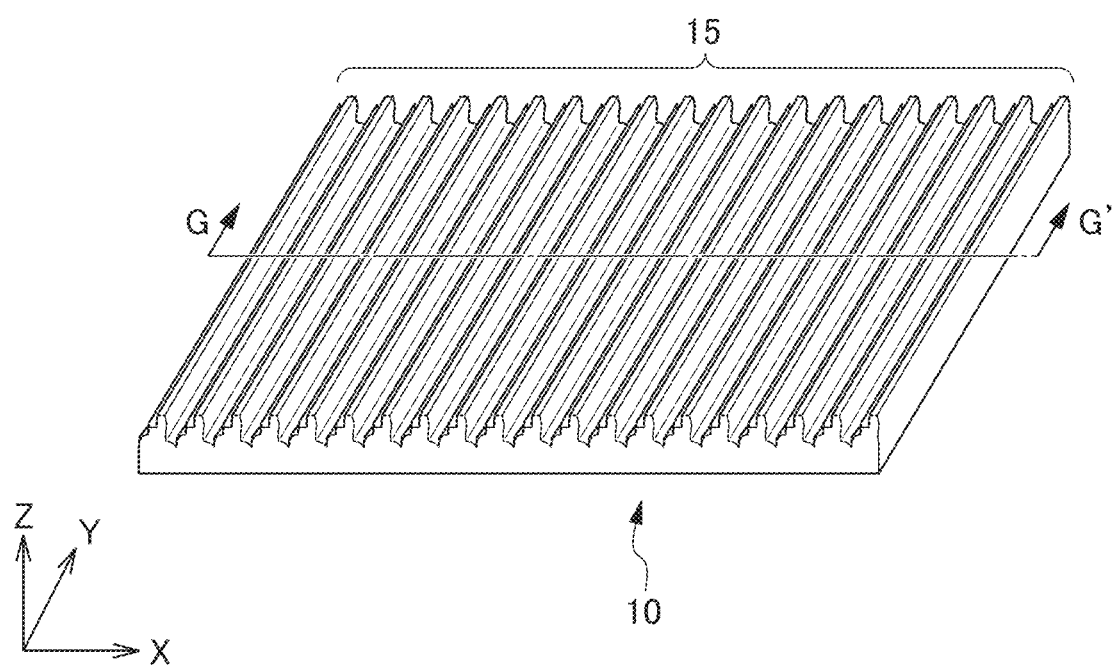
FIG. 2 is a perspective view illustrating an example of a partial periodic structure for the example of the diffractive optical element of FIG. 1.

FIG. 2 is a perspective view illustrating an example of a partial periodic structure in the example of the diffractive optical element of FIG. 1.

Figure 3:
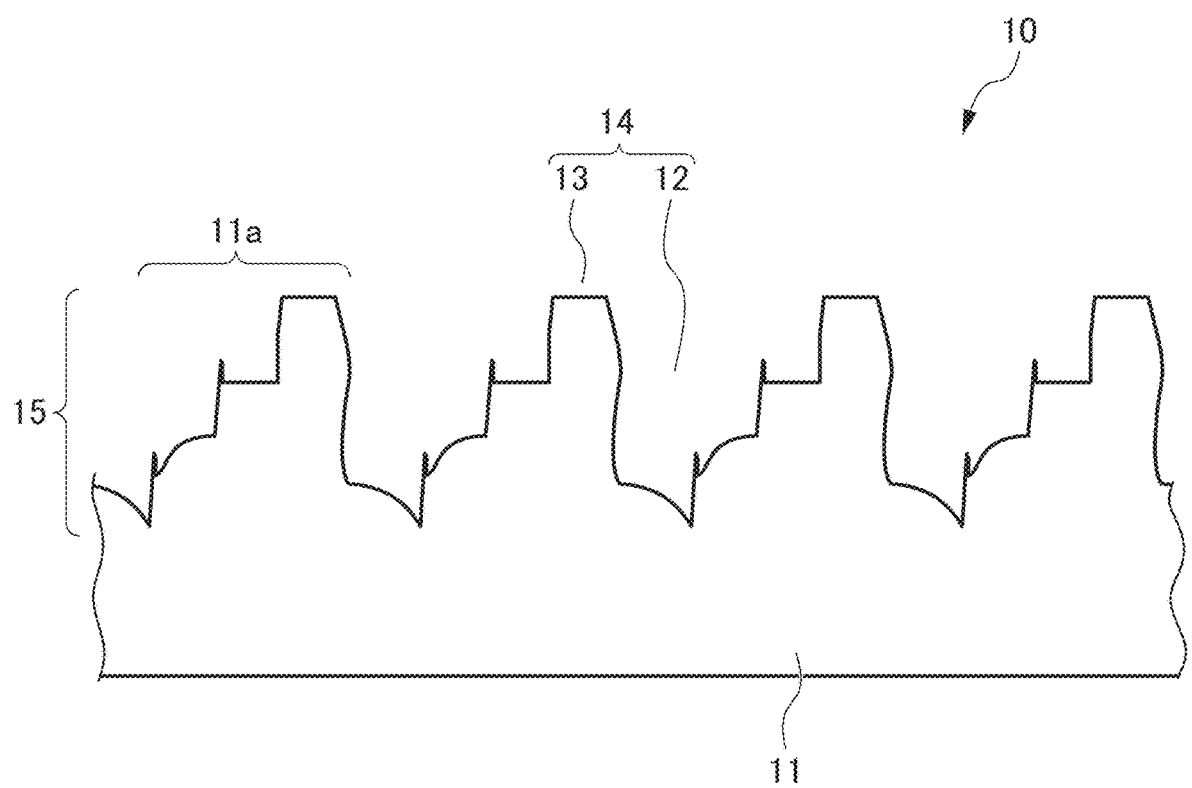
FIG. 3 is a cross-sectional view of the diffractive optical element taken along an arrow G-G' in FIG. 2.

FIG. 3 is a cross-sectional view of the diffractive optical element taken along an arrow G-G' in FIG. 2.

In addition, each figure including FIG. 1 below is a view schematically illustrated, and the size and shape of each part are exaggerated for the better understanding on a case-by-case basis.

In addition, in the following description, specific numerical values, shapes, materials, and the like are illustrated and described, but these may be appropriately changed.

In addition, with respect to terms such as "parallel," "perpendicular," and "same" and values of lengths and angles, and the like that specify shapes and geometrical conditions, and the degrees thereof, which are used in the present invention, it should be interpreted that each term is not limited to a strict definition but includes a range in which similar functions are feasible. In addition, in this specification, a phrase "to be viewed in a plan view" denotes to see a plate surface of a diffractive optical element in a direction perpendicular to the plate surface on which fine shapes are formed. That is, this phrase corresponds to visual recognition from the direction perpendicular to the surface having the diffractive layer of the diffractive optical element (that is a state visually recognized from the plus side of the Z-axis in FIG. 2, and a plan view like FIG. 1 is visually recognized).

Figure 15A:
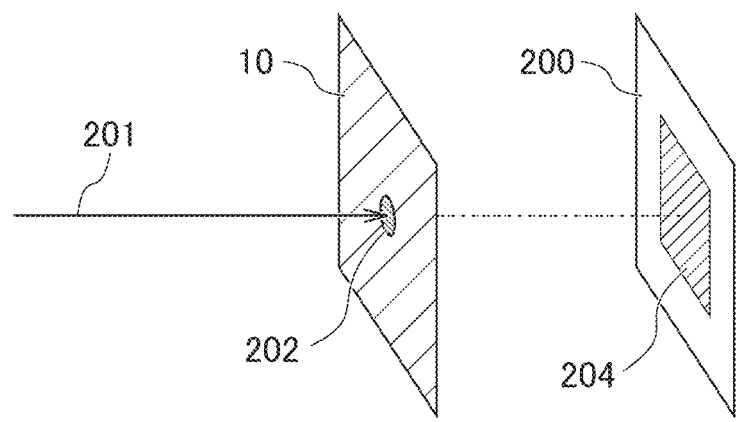
FIGS. 15A and 15B are each a view illustrating a diffractive optical element.
Figure 15B:
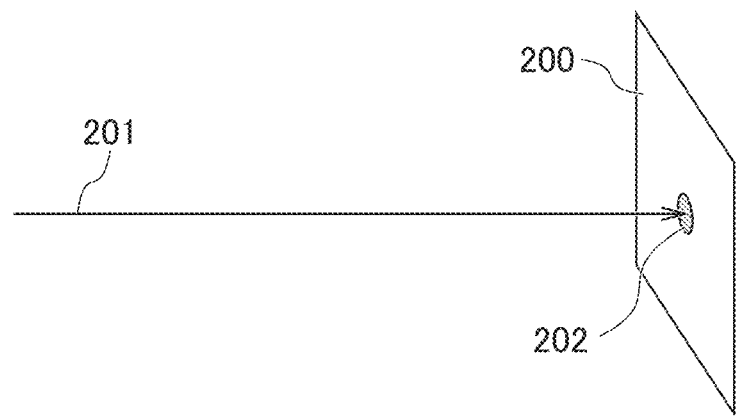

In addition, in the present invention, a phrase "shaping light" denotes shaping light (irradiation area) projected onto an object or a target area into a desired shape by controlling the traveling direction of the light. For example, as illustrated in the example of FIGS. 15A and 15B, light 201 (FIG. 15B) is prepared, in which an irradiation area 202 is circular in the case of being directly projected on a screen 200 having a planar shape. The phrase "shaping light" represents forming a irradiation area 204 into a target shape such as a square shape (FIG. 15A), a rectangular shape, and a circular shape (not illustrated) by allowing the light 201 to pass through a diffractive optical element 10 of the present invention.

In addition, in the present invention, the term "transparent" denotes transmission of light for at least wavelengths in use. For example, though a material does not transmit visible light, if the material transmits infrared rays, the material is eligible to be transparent in a case where the material is used for infrared applications.

A diffractive optical element 10 of a first embodiment is a diffractive optical element (DOE) that shapes light. The diffractive optical element 10 is designed for a case of an infrared laser beam having a wavelength of 980 nm so as to spread light in a cross shape, in which two bands of light spreading at ±50 degrees with ±3.3 degrees of widths intersect each other, specifically.

The diffractive optical element 10 of the first embodiment has different depths at positions A, B, C, and D illustrated in FIG. 1. That is, the diffractive optical element 10 is configured with a multistep shape with four different heights. The diffractive optical element 10 usually has a plurality of areas (partial periodic structures: for example, E and F areas in FIG. 1) having different periodic structures. In FIG. 2, an extracted example of the partial periodic structure is illustrated.

As illustrated in FIG. 3, the diffractive optical element 10 includes a high refractive index part 11 in which a plurality of protruding portions 11a are arranged side by side in a sectional shape. The high refractive index part 11 extends in a depth direction of the cross section while maintaining the same sectional shape.

The high refractive index part 11 may be produced, for example, by processing the shape of quartz (SiO$_2$, synthetic quartz) by dry etching treatment or by curing an ionizing radiation curable resin composition. Various methods for producing such a periodic structure are known, and the periodic structure can be appropriately prepared by these known methods. The shape of the inclined portion or the like according to the present application described below is mainly realized by adjusting various conditions of the dry etching process.

In addition, air exists in the upper portion in FIG. 3, which includes a recessed section 12 formed between the protruding portions 11a and a space 13 in the vicinity of the top portion of the protruding portion 11a. The upper portion is configured to be a low refractive index part 14 having a low refractive index than the high refractive index part 11. By the periodic structure in which the high refractive index part 11 and the low refractive index part 14 are alternately arranged side by side, a diffractive layer 15 having a function of shaping light is provided.

Figure 4:
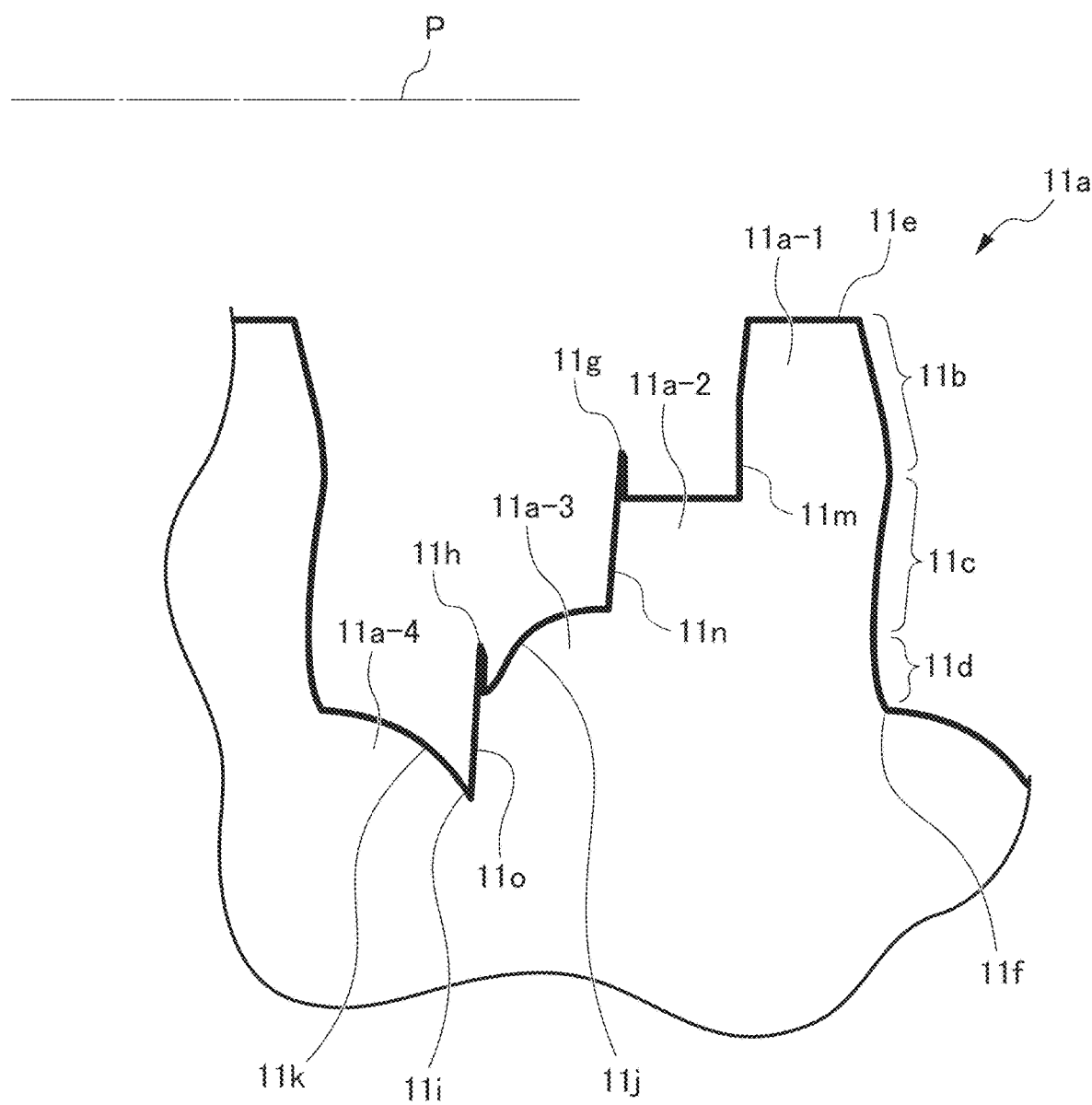

FIG. 4 is an enlarged view illustrating the protruding portion 11a.

The protruding portion 11a has a multistep shape including four step areas having different heights on one side (the left side in FIG. 4) of the cross-section. More specifically, the protruding portion 11a has a most protruding level-1 step area 11a-1, a level-2 step area 11a-2 which is by one stage lower than the level-1 step area 11a-1, a level-3 step area 11a-3 which is by one stage still lower than the level-2 step area 11a-2, and a level-4 step area 11a-4 which is by one stage still lower than the level-3 step area 11a-3 on one side.

In addition, another side (the right side in FIG. 4) of the cross-section opposite to the step area of the protruding portion 11a has a plurality of inclined portions inclined with respect to a flat plane P including the diffractive layer 15. More specifically, a first inclined portion 11b, a second inclined portion 11c, and a third inclined portion 11d are provided to the protruding portion 11a.

The first inclined portion 11b is an inclined curvilinear surface inclined in a direction in which the width of the protruding portion 11a increases from a distal end portion 11e of the level-1 step area 11a-1 toward a base portion 11f.

The inclined surface including the inclined surface of the first inclined portion 11b mainly represents an inclined curvilinear surface, which will be described. However, these inclined surfaces may include portions configured with flat planes.

The second inclined portion 11c is an inclined curvilinear surface inclined in a direction in which the width of the protruding portion 11a decreases from the first inclined portion 11b toward the base portion 11f.

The third inclined portion 11d is an inclined curvilinear surface inclined in a direction in which the width of the protruding portion 11a increases from the second inclined portion 11c toward the base portion 11f.

In addition, the protruding portion 11a is provided with acute angle portions 11g, 11h, and 11i.

The acute angle portion 11g, which is disposed at the boundary between the level-2 step area 11a-2 and the level-3 step area 11a-3 adjacent to each other, protrudes toward the low refractive index part 14 at an acute angle with a width smaller than widths of the level-2 step area 11a-2 and the level-3 step area 11a-3.

The acute angle portion 11h, which is disposed at the boundary between the level-3 step area 11a-3 and the level-4 step area 11a-4 adjacent to each other, protrudes toward the low refractive index part 14 at an acute angle with a width smaller than widths of the level-3 step area 11a-3 and the level-4 step area 11a-4.

The acute angle portion 11i, which is disposed at the boundary between the level-3 step area 11a-3 and the level-4 step area 11a-4 adjacent to each other, is formed to be depressed from the low refractive index part 14 toward the high refractive index part 11 at an acute angle with a width smaller than widths of the level-3 step area 11a-3 and the level-4 step area 11a-4.

In addition, each of a wall portion 11m between the level-1 step area 11a-1 and the level-2 step area 11a-2, a wall portion 11n between the level-2 step area 11a-2 and the level-3 step area 11a-3, and a wall portion 11o between the level-3 step area 11a-3 and the level-4 step area 11a-4 is configured as an inclined surface inclined in a direction in which the width of the protruding portion 11a increases from the low refractive index part 14 toward the high refractive index part 11.

Furthermore, since a ridge 11j and a ridge 11k are rounded among the ridges of the multistep shape of the protruding portion 11a, the ridge 11j and the ridge 11k are inclined smoothly.

The ridge 11j is a ridge between the level-3 step area 11a-3 and the acute angle portion 11i, and the corner of the ridge is rounded, so that the ridge has a form being inclined smoothly. With respect to the ridge 11j, since the acute angle portion 11h is formed near the ridge 11j, the ridge may also be regarded as a ridge between the level-3 step area 11a-3 and the acute angle portion 11h. However, since the acute angle portion 11h is an additional one, the ridge 11j should be regarded as a shape of a rounded ridge between the level-3 step area 11a-3 and the acute angle portion 11i without considering the acute angle portion 11h.

The ridge 11k is a ridge between the level-4 step area 11a-4 and the acute angle portion 11i, and the corner of the ridge is rounded, so that the ridge is configured to incline smoothly. In addition, if the acute angle portion 11i is not formed, the ridge 11k has no angle and results in a corner.

For example, in the case of designing a rectangular diffusion shape spreading with ±50° (long side)×±3.3° (short side) for laser light of 980 nm in a 4-level using quartz, the optimum depth of a diffraction grating becomes 1,633 nm, the pitch becomes 1,280 nm, and the width of the protruding portion becomes 960 nm.

The design can be carried out by using various simulation tools such as GratingMOD (produced by Rsoft Inc.) using a rigorous coupled wave analysis (RCWA) algorithm and Virtuallab (produced by LightTrans) using an iterative Fourier transform algorithm (IFTA).

In addition, the height of the protruding portion 11a may be preferably 650 nm or more. This is because, in the case of calculation at a wavelength of 780 nm and a refractive index of 1.6, the height of the protruding portion 11a is required to be 650 nm at a 2-level, 975 nm at a 4-level, and 1137 nm at an 8-level.

As described above, the first inclined portion 1ib, the second inclined portion 11c, and the third inclined portion 11d are connected to each other from the distal end portion 11e. Accordingly, the width of the protruding portion 11a spreads from the distal end portion 11e toward the base portion 11f then decreases. The width becomes the smallest at the boundary portion between the second inclined portion 11c and the third inclined portion 11d, when viewed as the width of one step area, that is, level-1 step area 11a-1, to form a constricted portion. In addition, the width increases at the third inclined portion 11d and reaches the base portion 11f. Therefore, the side (the right side in FIG. 4) of the cross-section opposite to the step area of the protruding portion 11a is a combination of a plurality of inclined surfaces having different orientations when the cross-section is viewed in detail.

In addition, the acute angle portions 11g, 11h, and 11i and ridges 11j and 11k configured as smoothly inclined surfaces having rounded corners are provided on the step area side of the protruding portion 11a.

As described above, the diffractive optical element 10 of the first embodiment has the multistep shape similarly to the shape of the diffractive optical element in the related art as a whole. However, when the sectional shape is viewed in detail, the sectional shape is configured to be a combination of various inclined surfaces and curved surfaces.

The function and effect of the diffractive optical element 10 of the first embodiment will be described later with reference to evaluation results as compared with other embodiments and Comparative Example.

Second Embodiment

Figure 5:
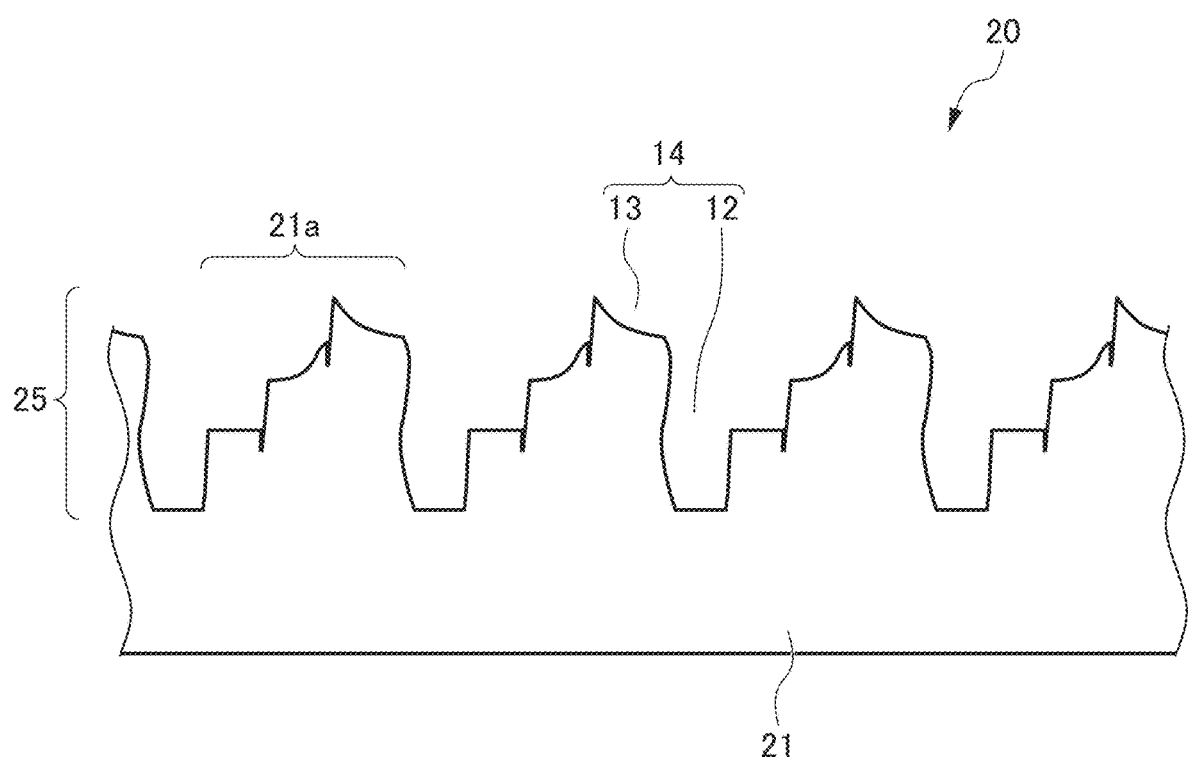
FIG. 5 is a view illustrating a diffractive optical element 20 of a second embodiment in a cross section similar to FIG. 3.

FIG. 5 is a view illustrating a diffractive optical element 20 of a second embodiment in a cross section similar to FIG. 3.

The diffractive optical element 20 of the second embodiment has the same form as that of the first embodiment except that the shape of a protruding portion 21a is different from that of the diffractive optical element 10 of the first embodiment. Therefore, the portions which perform the same functions as those of the first embodiment are denoted with the same reference symbols, and redundant descriptions will be omitted on a case-by-case basis.

The diffractive optical element 20 includes a high refractive index part 21 having the protruding portion 21a and a low refractive index part 14 including a recessed section 12 and a space 13. A diffractive layer 25 having a function of shaping light is configured with a periodic structure where the high refractive index part 21 and the low refractive index part 14 are alternately arranged side by side.

The protruding portion 21a is the same as the protruding portion 11a of the first embodiment except that the shapes are different from each other. Hereinafter, the shape of the protruding portion 21a will be described.

Figure 6:
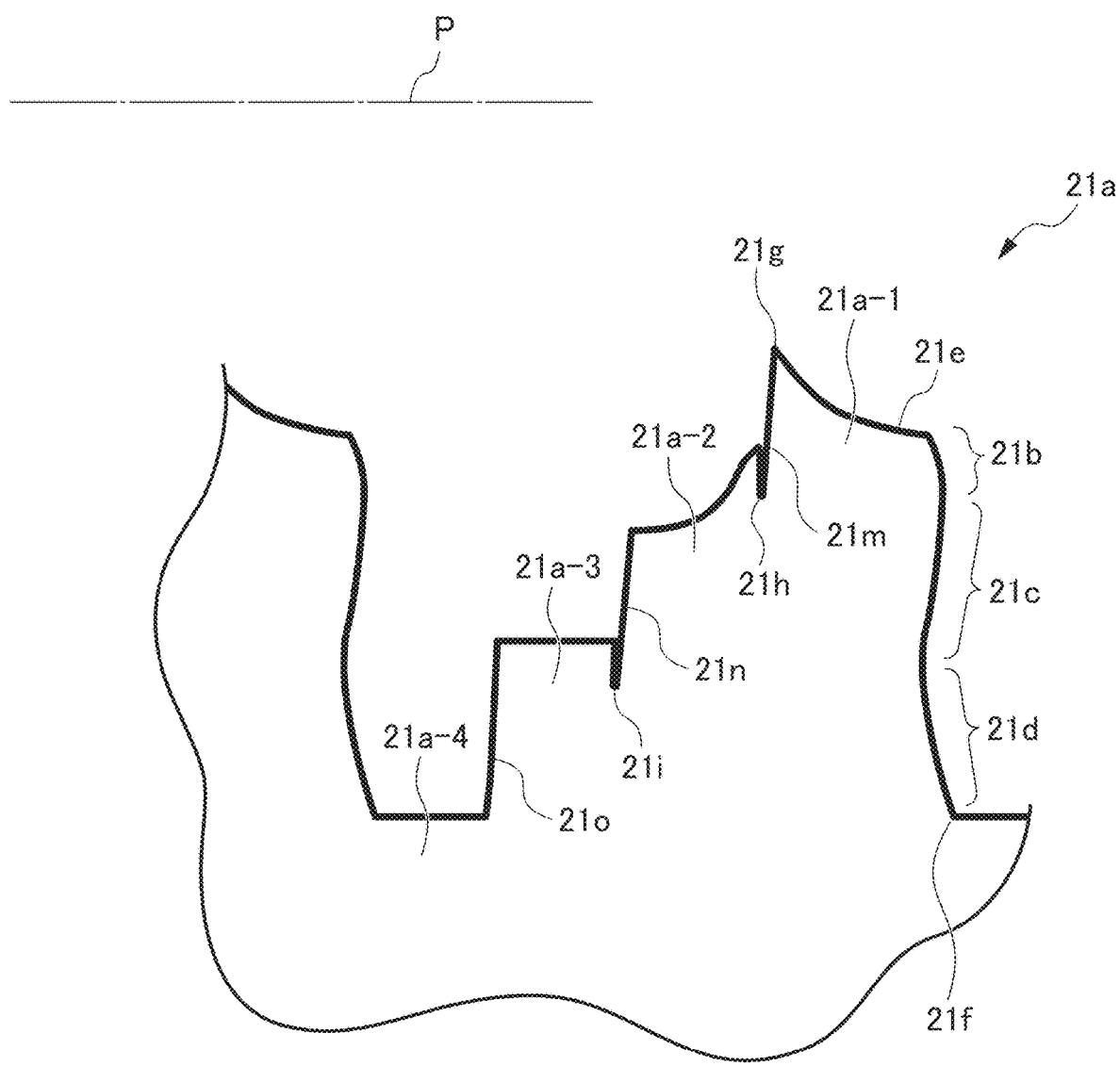

FIG. 6 is an enlarged view illustrating the protruding portion 21a.

The protruding portion 21a has a multistep shape including four step areas having different heights on one side (the left side in FIG. 6) of a cross-section. More specifically, the protruding portion 21a has a most protruding level-1 step area 21a-1, a level-2 step area 21a-2 which is by one stage lower than the level-1 step area 21a-1, a level-3 step area 21a-3 which is by one stage still lower than the level-2 step area 21a-2, and a level-4 step area 21a-4 which is by one stage still lower than the level-3 step area 21a-3 on the one side.

In addition, another side (the right side in FIG. 6) of the cross-section opposite to the step area of the protruding portion 21a has a plurality of inclined portions inclined with respect to a flat plane P including the diffractive layer 25. More specifically, a first inclined portion 21b, a second inclined portion 21c, and a third inclined portion 21d are provided to the protruding portion 21a.

The first inclined portion 21b is an inclined curvilinear surface inclined in a direction in which the width of the protruding portion 21a increases from a distal end portion 21e of the level-1 step area 21a-1 toward a base portion 21f. The inclined surface including the inclined surface of the first inclined portion 21b mainly represents an inclined curvilinear surface, which will be described. However, these inclined surfaces may include portions configured with flat planes.

The second inclined portion 21c is an inclined curvilinear surface inclined in a direction in which the width of the protruding portion 21a decreases from the first inclined portion 21b toward the base portion 21f.

The third inclined portion 21d is an inclined curvilinear surface inclined in a direction in which the width of the protruding portion 21a increases from the second inclined portion 21c toward the base portion 21f.

In addition, the protruding portion 21a is provided with acute angle portions 21g, 21h, and 21i.

The acute angle portion 21g, which is disposed at the corner portion of the boundary between the first level step area 21a-1 and the level-2 step area 21a-2 adjacent to each other, protrudes toward the low refractive index part 14 at an acute angle with a width smaller than widths of the level-1 step area 21a-1 and the level-2 step area 21a-2.

The acute angle portion 21h, which is disposed at the corner portion of the boundary between the level-1 step area 21a-1 and the level-2 step area 21a-2 adjacent to each other, is formed to be depressed from the low refractive index part 14 toward the high refractive index part 11 at an acute angle with a width smaller than widths of the level-1 step area 21a-1 and the level-2 step area 21a-2.

The acute angle portion 21i, which is disposed at the boundary between the level-2 step area 21a-2 and the level-3 step area 21a-3 adjacent to each other, is formed to be depressed from the low refractive index part 14 toward the high refractive index part 11 at an acute angle with a width smaller than widths of the level-2 step area 21a-2 and the level-3 step area 21a-3.

In addition, each of a wall portion 21m between the level-1 step area 21a-1 and the level-2 step area 21a-2, a wall portion 21n between the level-2 step area 21a-2 and the level-3 step area 21a-3, and a wall portion 21o between the level-3 step area 21a-3 and the level-4 step area 21a-4 is configured as an inclined surface inclined in a direction in which the width of the protruding portion 21a increases from the low refractive index part 14 toward the high refractive index part 21.

In addition, the distal end portion 21e of the level-1 step area 21a-1 and the distal end portion 21j of the level-2 step area 21a-2 are formed to be an inclined curvilinear surface depressed toward the high refractive index part 21.

In addition, the shape of the diffractive optical element 20 of the second embodiment is an inverted plate shape of the diffractive optical element 10 of the first embodiment. Therefore, in manufacturing the diffractive optical element 20 of the second embodiment, after manufacturing the diffractive optical element 10 of the first embodiment, a first inverted plate is manufactured by performing shape molding from this diffractive optical element 10. Then, the first inverted plate is further molded to manufacture a second inverted plate, and shaping with an ionizing radiation curable resin is performed by using the second inverted plate to obtain the diffractive optical element 20.

The function and effect of the diffractive optical element 20 of the second embodiment will also be described later with reference to evaluation results compared with other embodiments and Comparative Example.

Third Embodiment

Figure 7:
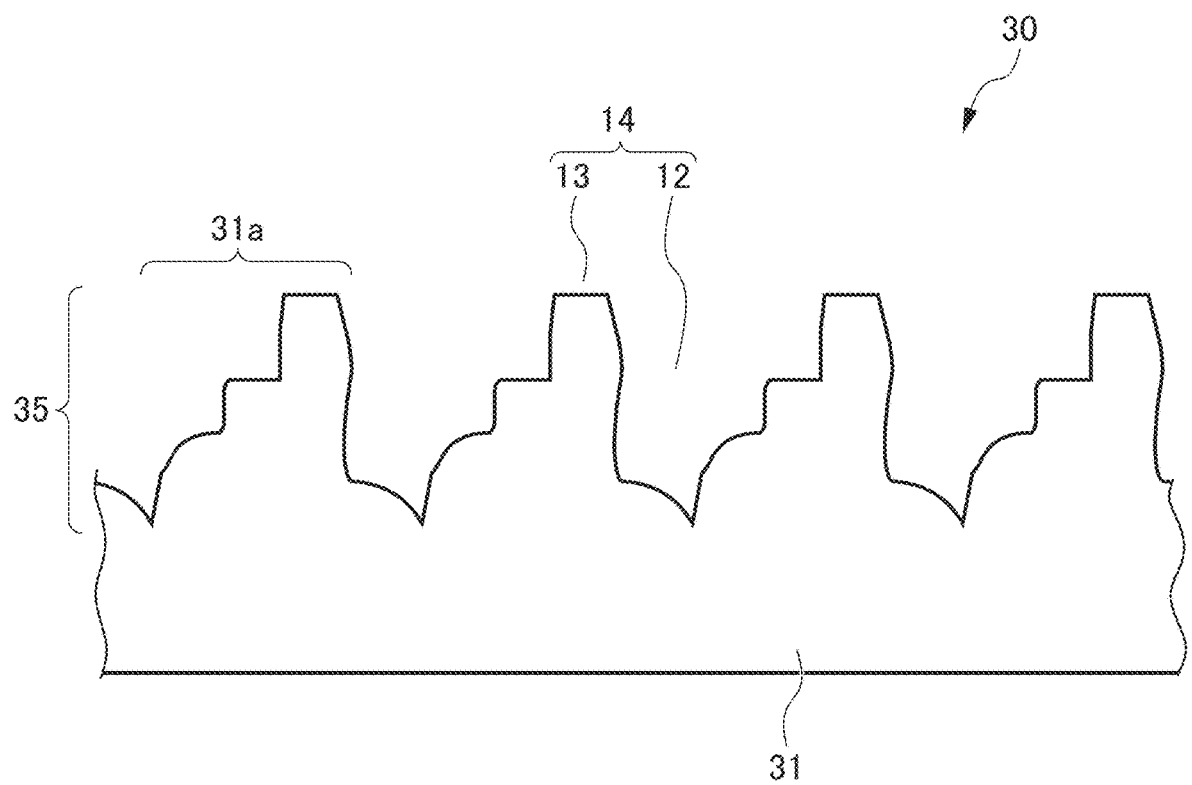
FIG. 7 is a view illustrating a diffractive optical element 30 of a third embodiment in a cross section similar to FIG. 3.

FIG. 7 is a view illustrating a diffractive optical element 30 of a third embodiment in a cross section similar to FIG. 3.

The diffractive optical element 30 of the third embodiment has the same form as that of the first embodiment except that the shape of a protruding portion 31a is different from that of the diffractive optical element 10 of the first embodiment. Therefore, the portions which perform the same functions as those of the first embodiment are denoted with the same reference symbols, and redundant description will be appropriately omitted.

The diffractive optical element 30 includes a high refractive index part 31 having the protruding portion 31a and a low refractive index part 14 including a recessed section 12 and a space 13. A diffractive layer 35 having a function of shaping light is configured with a periodic structure where the high refractive index part 31 and the low refractive index part 14 are alternately arranged side by side.

The protruding portion 31a is the same as the protruding portion 11a of the first embodiment except that the shapes are different from each other. Hereinafter, the shape of the protruding portion 31a will be described.

Figure 8:
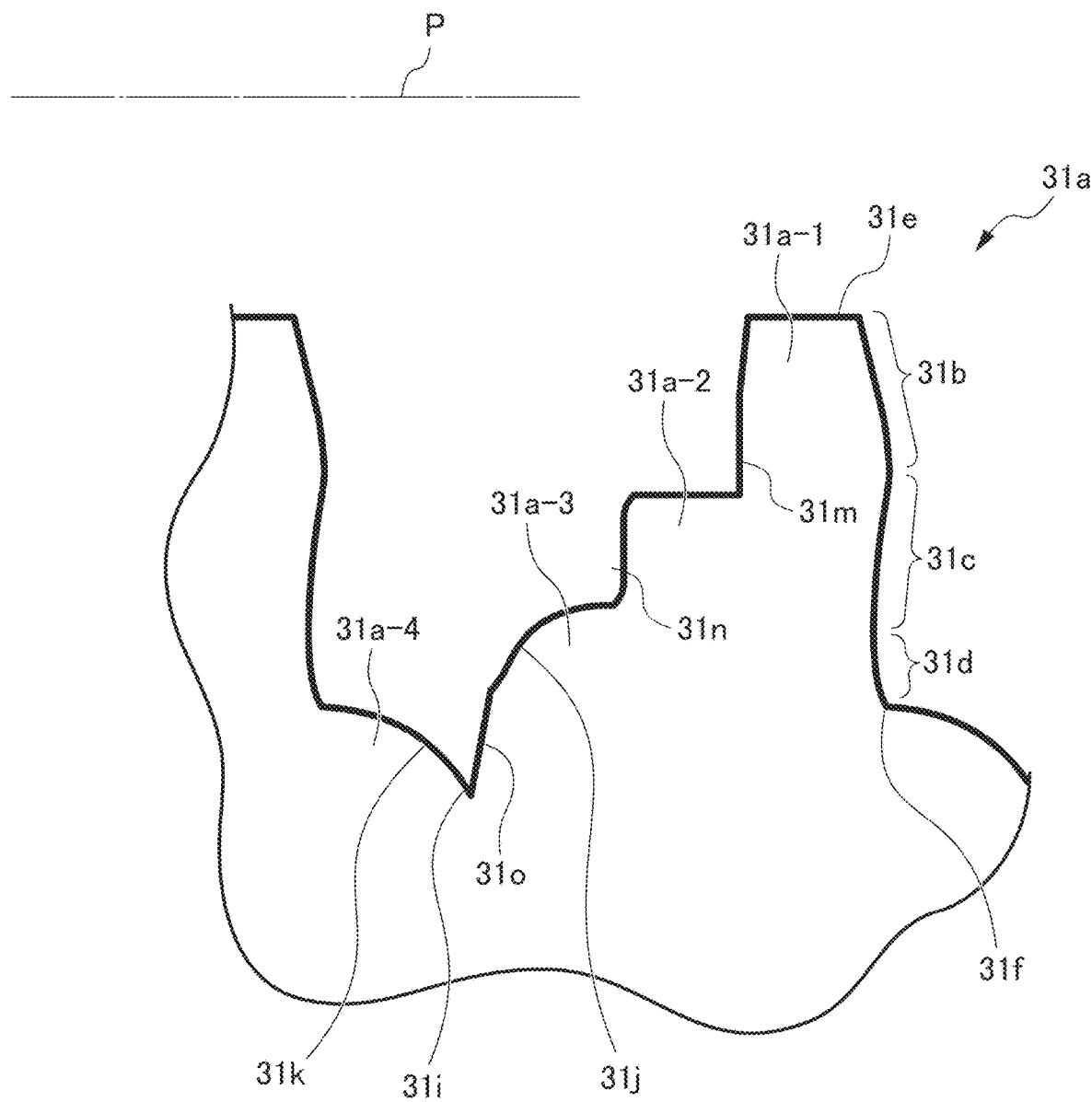

FIG. 8 is an enlarged view illustrating the protruding portion 31a.

The protruding portion 31a has a multistep shape including four step areas having different heights on one side (the left side in FIG. 8) of a cross-section. More specifically, the protruding portion 31a has a most protruding level-1 step area 31a-1, a level-2 step area 31a-2 which is by one stage lower than the level-1 step area 31a-1, a level-3 step area 31a-3 which is by one stage still lower than the level-2 step area 31a-2, and a level-4 step area 31a-4 which is by one stage still lower than the level-3 step area 31a-3 on the one side.

In addition, another side (the right side in FIG. 8) of the cross-section opposite to the step area of the protruding portion 31a has a plurality of inclined portions inclined with respect to a flat plane P including the diffractive layer 35. More specifically, a first inclined portion 31b, a second inclined portion 31c, and a third inclined portion 31d are provided to the protruding portion 31a.

The first inclined portion 31b is an inclined curvilinear surface inclined in a direction in which the width of the protruding portion 31a increases from the distal end portion 31e of the level-1 step area 31a-1 toward the base portion 31f. The inclined surface including the inclined surface of the first inclined portion 31b mainly represents an inclined curvilinear surface, which will be described. However, these inclined surfaces may include portions configured with flat planes.

The second inclined portion 31c is an inclined curvilinear surface inclined in a direction in which the width of the protruding portion 31a decreases from the first inclined portion 31b toward the base portion 31f.

The third inclined portion 31d is an inclined curvilinear surface inclined in a direction in which the width of the protruding portion 31a increases from the second inclined portion 31c toward the base portion 31f.

In addition, the protruding portion 31a is provided with an acute angle portion 31i.

The acute angle portion 31i, which is disposed at the boundary between the level-3 step area 31a-3 and the level-4 step area 31a-4 adjacent to each other, is formed to be depressed from the low refractive index part 14 toward the high refractive index part 31 at an acute angle with a width smaller than widths of the level-3 step area 31a-3 and the level-4 step area 31a-4.

In addition, each of a wall portion 31m between the level-1 step area 31a-1 and the level-2 step area 31a-2, a wall portion 31n between the level-2 step area 31a-2 and the level-3 step area 31a-3, and a wall portion 31o between the level-3 step area 31a-3 and the level-4 step area 31a-4 is configured as an inclined surface inclined in a direction in which the width of the protruding portion 31a increases from the low refractive index part 14 toward the high refractive index part 31.

Furthermore, among the ridges of the multistep shape of the protruding portion 31a, since a ridge 31j and a ridge 31k are rounded, the ridge 31j and the ridge 31k are inclined smoothly.

The ridge 31j is a ridge between the level-3 step area 31a-3 and the acute angle portion 31i, and the corner of the ridge is rounded, so that the ridge has a form being inclined smoothly.

The ridge 31k is a ridge between the level-4 step area 31a-4 and the acute angle portion 31i, and the corner of the ridge is rounded, so that the ridge has a form being inclined smoothly. In addition, if the acute angle portion 31i is not formed, the ridge 31k is a portion which has no corner.

The function and effect of the diffractive optical element 30 of the third embodiment will also be described later with reference to evaluation results as compared with other embodiments and Comparative Example.

Fourth Embodiment

Figure 9:
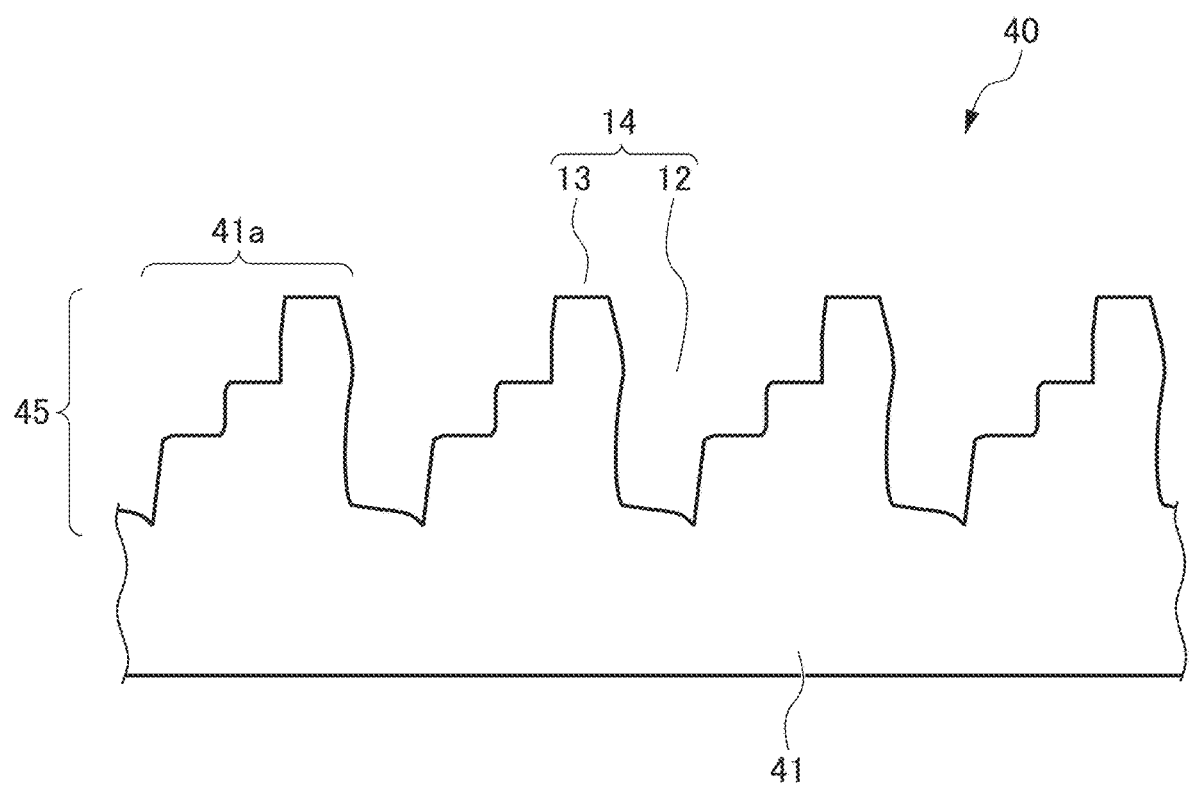
FIG. 9 is a view illustrating a diffractive optical element 40 of a fourth embodiment in a cross section similar to FIG. 3.

FIG. 9 is a view illustrating a diffractive optical element 40 of a fourth embodiment in a cross section similar to FIG. 3.

The diffractive optical element 40 of the fourth embodiment has the same form as that of the first embodiment except that the shape of a protruding portion 41a is different from that of the diffractive optical element 10 of the first embodiment. Therefore, the portions which perform the same functions as those of the first embodiment are denoted with the same reference symbols, and redundant description will be appropriately omitted.

The diffractive optical element 40 includes a high refractive index part 41 having the protruding portion 41a and a low refractive index part 14 including a recessed section 12 and a space 13, and a diffractive layer 45 having a function of shaping light is configured with a periodic structure where the high refractive index part 41 and the low refractive index part 14 are alternately arranged side by side.

The protruding portion 41a is the same as the protruding portion 11a of the first embodiment except that the shapes are different from each other. Hereinafter, the shape of the protruding portion 41a will be described.

Figure 10:
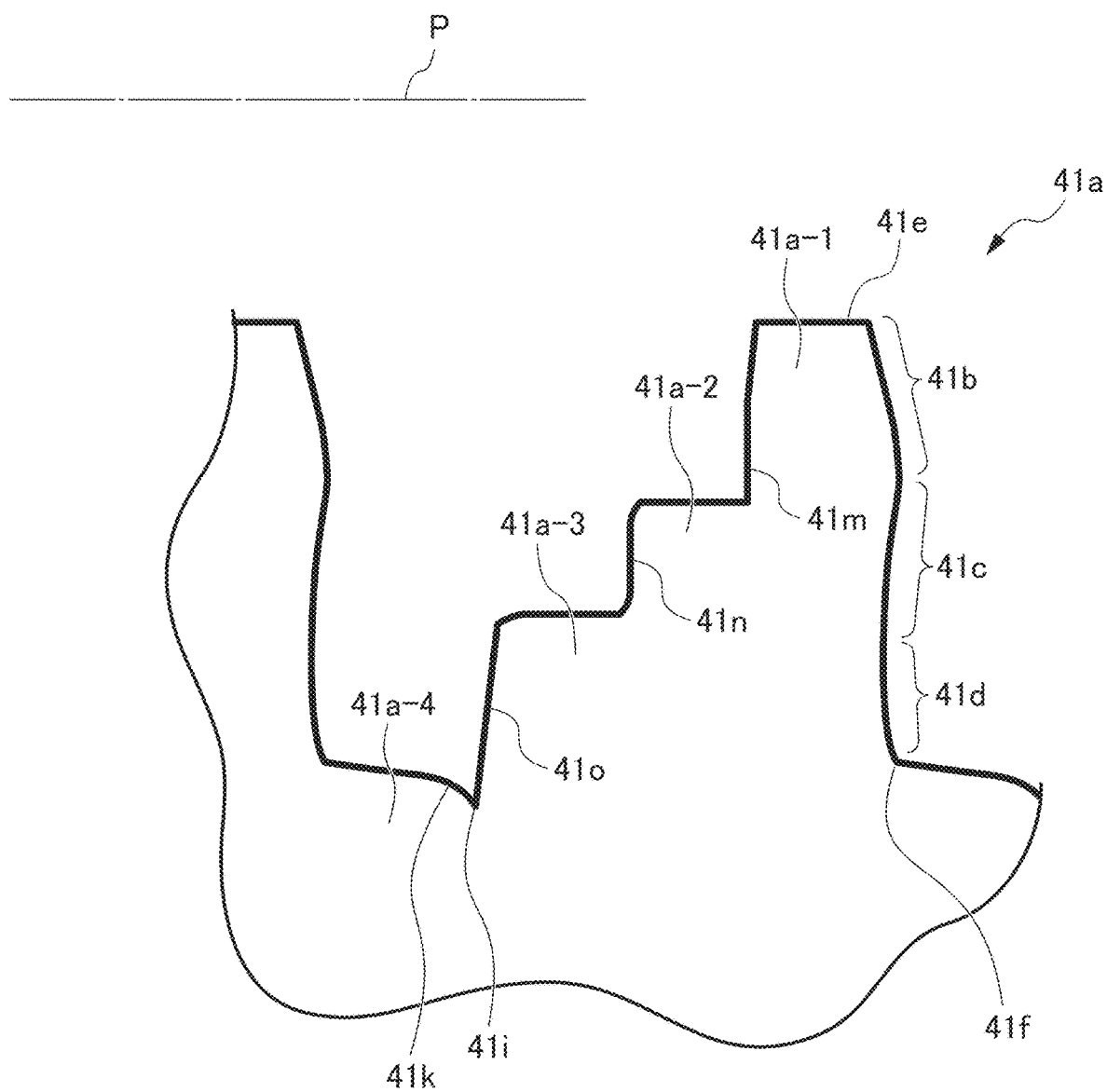

FIG. 10 is an enlarged view illustrating the protruding portion 41a.

The protruding portion 41a has a multistep shape including four step areas having different heights on one side (the left side in FIG. 10) of the cross-section. More specifically, the protruding portion 41a has a most protruding level-1 step area 41a-1, a level-2 step area 41a-2 which is by one stage lower than the level-1 step area 41a-1, a level-3 step area 41a-3 which is by one stage still lower than the level-2 step area 41a-2, and a level-4 step area 41a-4 which is by one stage still lower than the level-3 step area 41a-3 on the one side.

In addition, another side (the right side in FIG. 10) of the cross-section opposite to the step area of the protruding portion 41a has a plurality of inclined portions inclined with respect to a flat plane P including the diffractive layer 45. More specifically, a first inclined portion 41b, a second inclined portion 41c, and a third inclined portion 41d are provided to the protruding portion 41a.

The first inclined portion 41b is an inclined curvilinear surface inclined in a direction in which the width of the protruding portion 41a increases from the distal end portion 41e of the level-1 step area 41a-1 toward the base portion 41f. The inclined surface including the inclined surface of the first inclined portion 41b mainly represents an inclined curvilinear surface, which will be described. However, these inclined surfaces may include portions configured with flat planes.

The second inclined portion 41c is an inclined curvilinear surface inclined in a direction in which the width of the protruding portion 41a decreases from the first inclined portion 41b toward the base portion 41f.

The third inclined portion 41d is an inclined curvilinear surface inclined in a direction in which the width of the protruding portion 41a increases from the second inclined portion 41c toward the base portion 41f.

In addition, the protruding portion 41a is provided with an acute angle portion 41i.

The acute angle portion 41i, which is disposed at the boundary between the level-3 step area 41a-3 and the level-4 step area 41a-4 adjacent to each other, is formed to be depressed from the low refractive index part 14 toward the high refractive index part 41 at an acute angle with a width smaller than widths of the level-3 step area 41a-3 and the level-4 step area 41a-4.

In addition, each of a wall portion 41m between the level-1 step area 41a-1 and the level-2 step area 41a-2, a wall portion 41n between the level-2 step area 41a-2 and the level-3 step area 41a-3, and a wall portion 41o between the level-3 step area 41a-3 and the level-4 step area 41a-4 is configured as an inclined surface inclined in a direction in which the width of the protruding portion 41a increases from the low refractive index part 14 toward the high refractive index part 41.

In addition, a ridge 41k is a ridge between the level-4 step area 41a-4 and the acute angle portion 41i, and the corner of the ridge is rounded, so that the ridge has a form being inclined smoothly. In addition, if the acute angle portion 41i is not formed, the ridge 41k is a portion which has no corner.

The function and effect of the diffractive optical element 40 of the fourth embodiment will also be described later with reference to evaluation results as compared with other embodiments and Comparative Example.

Function and Effect of Each Embodiment

Next, the function and effect of each of the above-described embodiments will be described while comparing with Comparative Example. In order to confirm the function and effect of the diffractive optical element of each embodiment, Comparative Example to which the configuration of the present invention is not applied was prepared.

Figure 11:
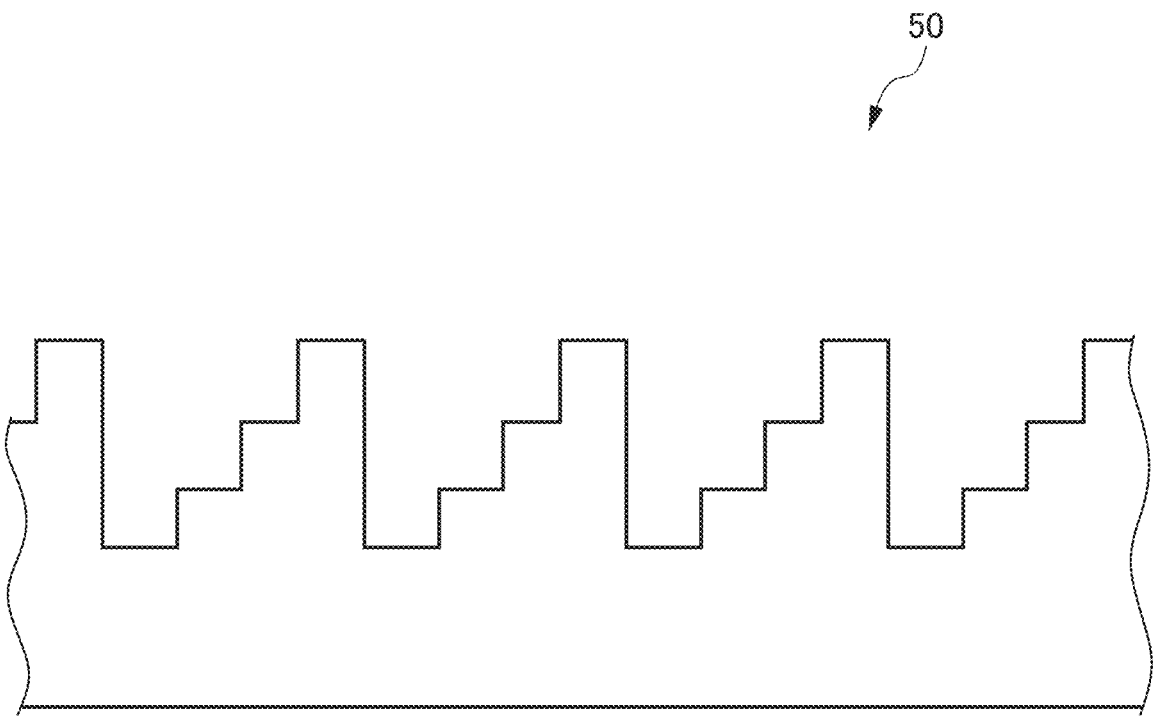

FIG. 11 is a cross-sectional view illustrating a diffractive optical element of Comparative Example similarly to FIG. 3 and the like.

A diffractive optical element 50 of Comparative Example is not provided with an inclined portion of the diffractive optical element of each embodiment but is configured as a multistep shape combining substantially complete rectangular shapes. In addition, similarly to the diffractive optical element of each embodiment, the diffractive optical element 50 of Comparative Example is designed for a case of an infrared laser beam having a wavelength of 980 nm so as to spread light in a cross shape, in which two bands of light spreading at ±50 degrees with ±3.3 degrees of widths intersect each other, specifically.

FIG. 12 is a view illustrating a setup of evaluation.

For the total four types of diffractive optical elements including the diffractive optical element 10 to 40 of the first to fourth embodiments and the diffractive optical element 50 of Comparative Example, testing of the shape of diffracted light and the reflected light was performed under the setup illustrated in FIG. 12.

As a screen S, a commercially available sheet of copy paper was used.

As infrared cameras CAM1 and CAM2, Prometric produced by Radiant Zemax, Inc. capable of detecting a wavelength of 980 nm was used. A visible light cutoff filter was attached to the infrared cameras CAM1 and CAM2 to prevent noise in measurement.

A light source L was set so as to irradiate the DOE (the diffractive optical elements 10 to 40 and the diffractive optical element 50 of Comparative Example) with an infrared laser beam having a wavelength of 980 nm with tilting of one degree. In addition, a light irradiation device was made up of the light source L and any one of the diffractive optical elements 10 to 40 arranged at a position through which light emitted by the light source L passes.

Under this condition, the light reflected on the surface of the diffractive optical element (DOE) and the light projected on the screen S were observed with the infrared cameras CAM1 and CAM2, respectively, and comparison was performed.

Variations in shapes projected on the screen when incidence angles of the infrared laser beam were varied by 1±1 degree were also tested. The results are listed in Table 1.

TABLE 1

Evaluation result

|  | First embodiment | Second embodiment | Third embodiment | Fourth embodiment | Comparative Example |
|---|---|---|---|---|---|
| Projected shape according to one-time incidence (Unevenness) | AAA | AAA | AA | A | A |
| Weakness of reflected light of DOE according to one-time incidence | AAA | AAA | AAA | AA | A |
| Little change in projected shape due to variation in incidence angle | AAA | AAA | AAA | AA | A |

In case where result of Comparative Example is A, equivalent case is set to A, somewhat better case is set to AA, and better case is set to AAA.

Referring to the results in Table 1, it can be seen that results equal to or better than those of Comparative Example were obtained with respect to the projected shape by one-time incidence, for a case where the inclined portions as in the first to fourth embodiments are provided. In particular, the diffractive optical element 10 of the first embodiment and the diffractive optical element 20 of the second embodiment demonstrate excellent results. The reasons for this are: the first embodiment and the second embodiment, in which many acute angle portions are formed, create sudden shape-change points. Accordingly, high-order diffraction light occurs, alleviating the unevenness in light distribution due to the variation in dimensions of the multistep shape.

Next, with respect to the weakness of the DOE reflected light due to one-time incidence, the results in Table 1 show that the first to fourth embodiments are better than Comparative Example. That is, the result that the reflected light is weak is obtained. Descriptions will be given of this result.

Figure 13A:
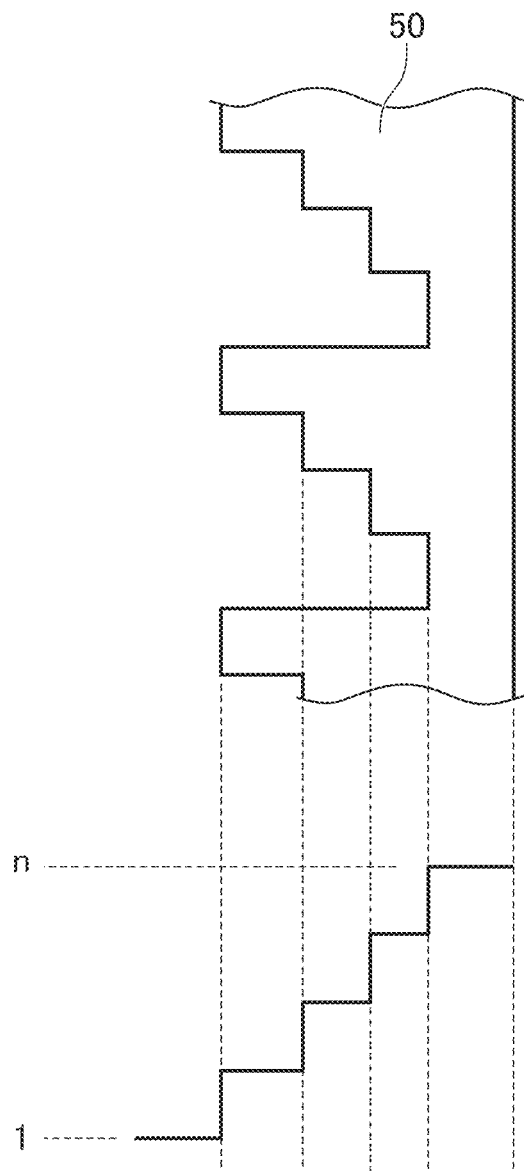
FIGS. 13A and 13B are each a view illustrating a mechanism of the diffractive optical element of the present invention having smaller reflected light than the diffractive optical element of Comparative Example.
Figure 13B:
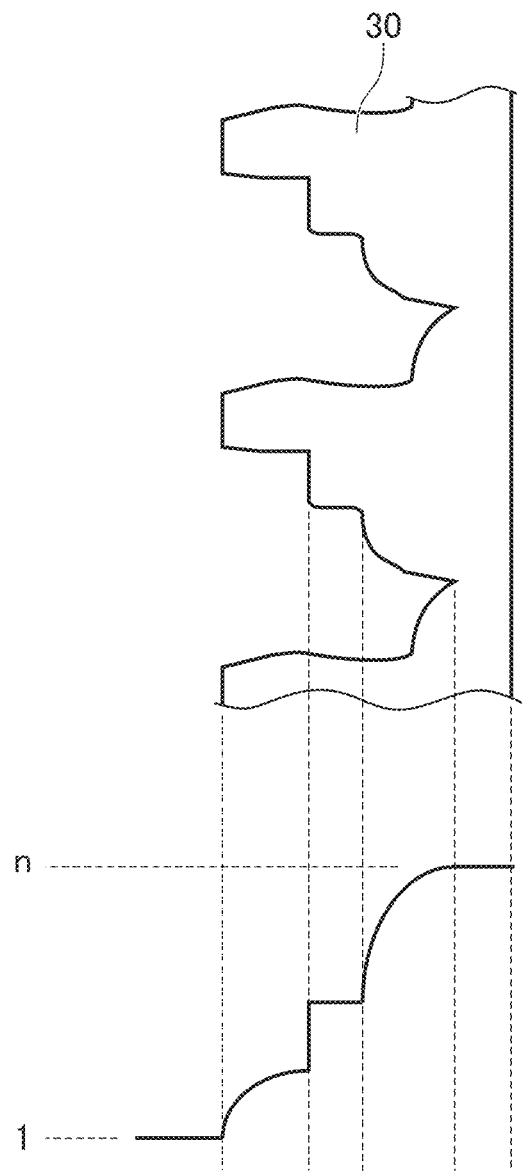

FIGS. 13A and 13B are views illustrating the reason why the diffraction optical element of the present invention has smaller reflected light than the diffractive optical element of Comparative Example.

In FIGS. 13A and 13B, the change in apparent refractive index is illustrated as a graph in accordance with the position of the sectional shape. FIG. 13A illustrates the case of the diffractive optical element 50 of Comparative Example, and FIG. 13B illustrates the case of the diffractive optical element 30 of the third embodiment.

In the diffractive optical element 50 of Comparative Example, since the shape rapidly changes, the apparent refractive index also abruptly changes. In contrast, in the diffractive optical element 30 of the third embodiment, since the inclined portion is provided, the shape does not abruptly change, so that the apparent refractive index gently changes, accordingly. Since reflection occurs at the interface at which the refractive index changes, in the diffractive optical element 30 of the third embodiment, the apparent refractive index gently changes, so that reflection at the interface is suppressed. It should be noted that the same phenomenon also applies to the diffractive optical elements 10, 20, and 40 other than the diffractive optical element 30 of the third embodiment. However, as can be seen from the results of Table 1, the effect of the suppression of the reflected light is higher in the diffractive optical elements 10 to 30 of the first to third embodiments than in the diffractive optical element 40 of the fourth embodiment. This is because the diffractive optical elements 10 to 30 of the first to third embodiments have more inclined surface parts than the diffractive optical element 40 of the fourth embodiment.

Next, with regard to the small change in the projected shape due to the variation in incidence angle in Table 1, the results of the first to fourth embodiments are better than that of Comparative Example, that is, the result that the reflected light is weak is obtained. Descriptions will be given of this result.

FIGS. 14A to 14D are each a view schematically illustrating a simplified relationship between a change in incidence angle and the diffracted light.

Figure 14A:
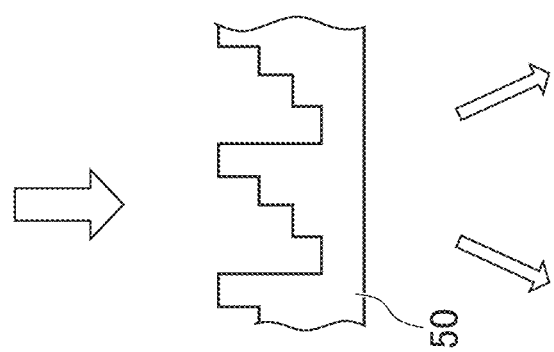
FIGS. 14A to 14D are each a view schematically illustrating a simplified relationship between a change in incidence angle and diffracted light.

FIG. 14A illustrates a diffraction state of light when light from the vertical direction which is the designed position is incident on the diffractive optical element 50 of Comparative Example. The light incident vertically on the diffractive optical element 50 is diffracted evenly to the left and the right as primary light.

Figure 14B:
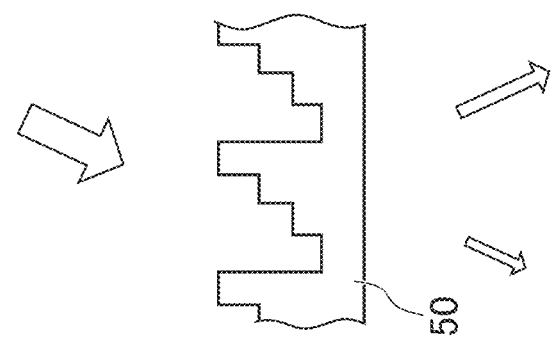

FIG. 14B illustrates a diffraction state of light when light from a position deviating from the design position is incident on the diffractive optical element 50 of Comparative Example. If light is incident obliquely on the diffractive optical element 50, as illustrated in FIG. 14B, the uniformity of light collapses. In general, since the optical design of the diffractive optical element is based on a simple shape as illustrated in FIG. 14A, if the incident state of the light changes, the diffractive state of the light of the diffractive optical element changes as a whole.

Figure 14C:
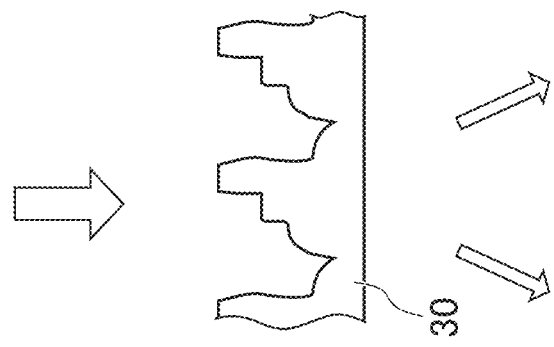

FIG. 14C illustrates a diffraction state of light when light from the designed vertical direction is incident on the diffractive optical element 30 of the third embodiment. Also in the diffractive optical element 30 in which the inclined portion is provided in a portion of the sectional shape, the light incident vertically on the diffractive optical element 30 diffracts evenly to the left and right as the primary light.

Figure 14D:
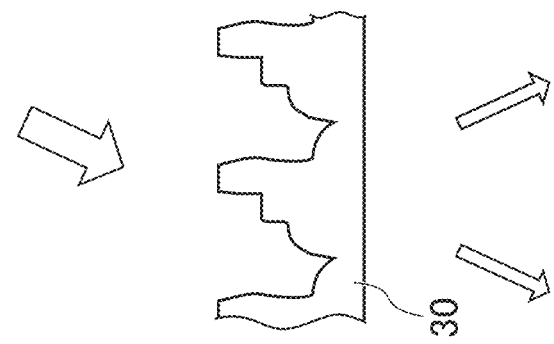

FIG. 14D illustrates a diffraction state of light when light is incident on the diffractive optical element 30 of the third embodiment from a position deviating from the designed position. In the diffractive optical element 30 in which the inclined portion is provided in a portion of the sectional shape, even if the incidence direction of the light varies to some extent, there is always a portion perpendicular to the light, so that it is not likely that the distribution of the diffracted light is affected. Therefore, as listed in Table 1, the result that the change of the projected shape is small is obtained.

Although the diffractive optical element 40 of the fourth embodiment has better results than the diffractive optical element 50 of Comparative Example, the diffractive optical element 40 has worse results than other embodiments with respect to the stability of change in the projected shape due to the variation in incidence angle. This is because the diffractive optical element 40 of the fourth embodiment has fewer inclined portions than other embodiments and there are many portions susceptible to the influence of the incidence angle, accordingly.

As described above, according to the diffractive optical elements 10, 20, 30, and 40 of the first to fourth embodiments, the protruding portions of which are provided with the inclined portions, it is possible to reduce the light reflected at the interface and improve the optical utilization efficiency, accordingly.

In addition, according to the diffractive optical elements 10, 20, 30, and 40 of the first to fourth embodiments, the protruding portions of which are provided with the inclined portions, it is less susceptible to the incident angle changes due to the assembling accuracy of the device and the performance fluctuation of the light source. Accordingly, it is possible to obtain stably desired diffracted light.

Furthermore, according to the diffractive optical elements 10, 20, 30, and 40 of the first to fourth embodiments, which are provided with the acute angle portions, it is possible to alleviate the unevenness in light distribution due to the variation in dimensions of the multistep shape when high-order diffracted light occurs.

Fifth Embodiment

Figure 17:
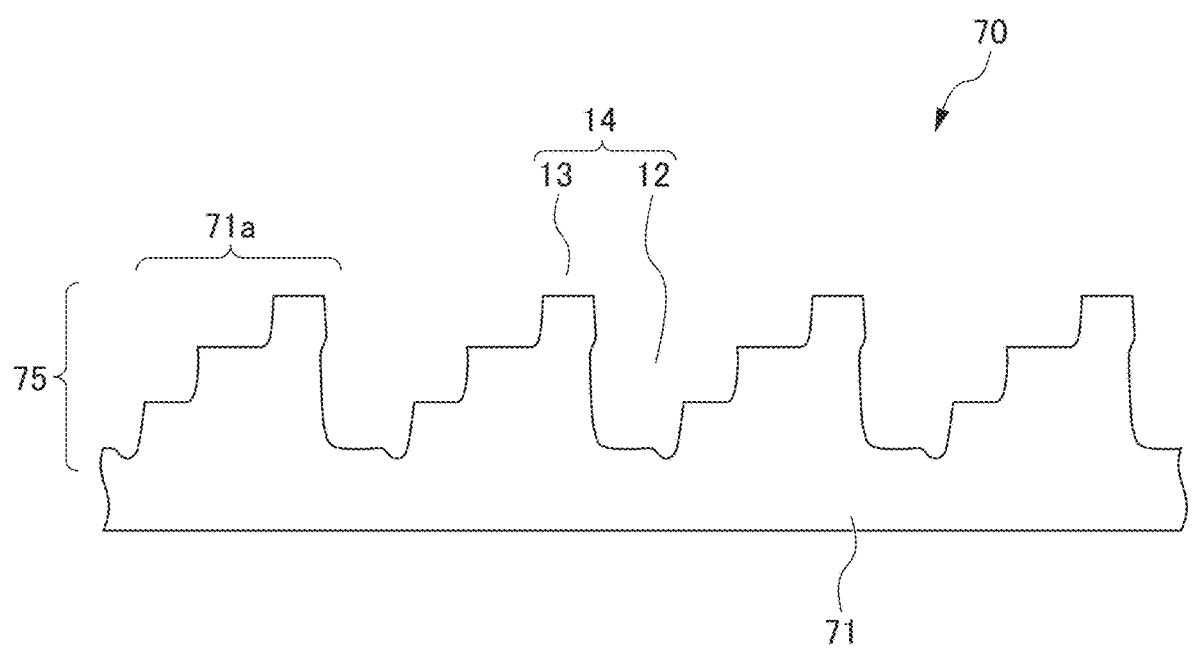
FIG. 17 is a view illustrating a diffractive optical element 70 of a fifth embodiment in a cross section similar to FIG. 3.

FIG. 17 is a view illustrating a diffractive optical element 70 of a fifth embodiment in a cross section similar to FIG. 3.

The diffractive optical element 70 of the fifth embodiment has the same form as that of the first embodiment except that the shape of a protruding portion 71a is different from that of the diffractive optical element 10 of the first embodiment. Therefore, the portions which perform the same functions as those of the first embodiment are denoted with the same reference symbols, and redundant description will be appropriately omitted.

The diffractive optical element 70 includes a high refractive index part 71 having the protruding portion 71a and a low refractive index part 14 including a recessed section 12 and a space 13, and a diffractive layer 55 having a function of shaping light is configured with a periodic structure where the high refractive index part 71 and the low refractive index part 14 are alternately arranged side by side.

The protruding portion 71a is the same as the protruding portion 11a of the first embodiment except that the shapes are different from each other. Hereinafter, the shape of the protruding portion 71a will be described.

Figure 18:
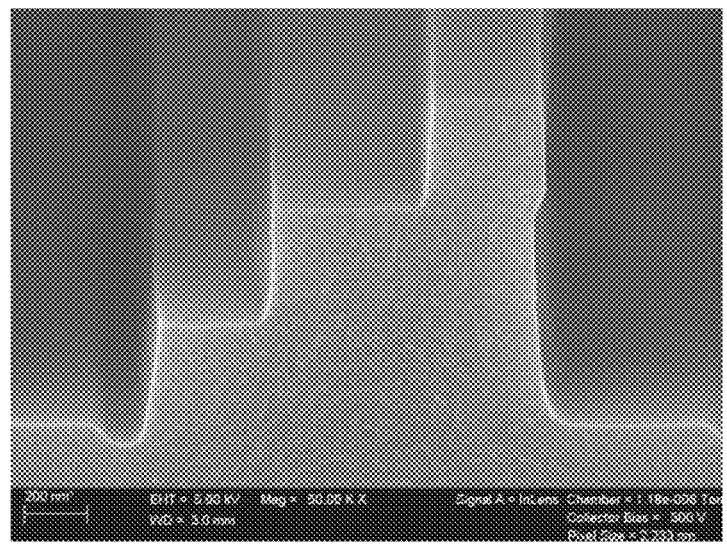
FIG. 18 is an enlarged photograph of the diffractive optical element 70 of the fifth embodiment actually manufactured.

FIG. 18 is an enlarged photograph of the diffractive optical element 70 of the fifth embodiment actually manufactured.

Figure 19:
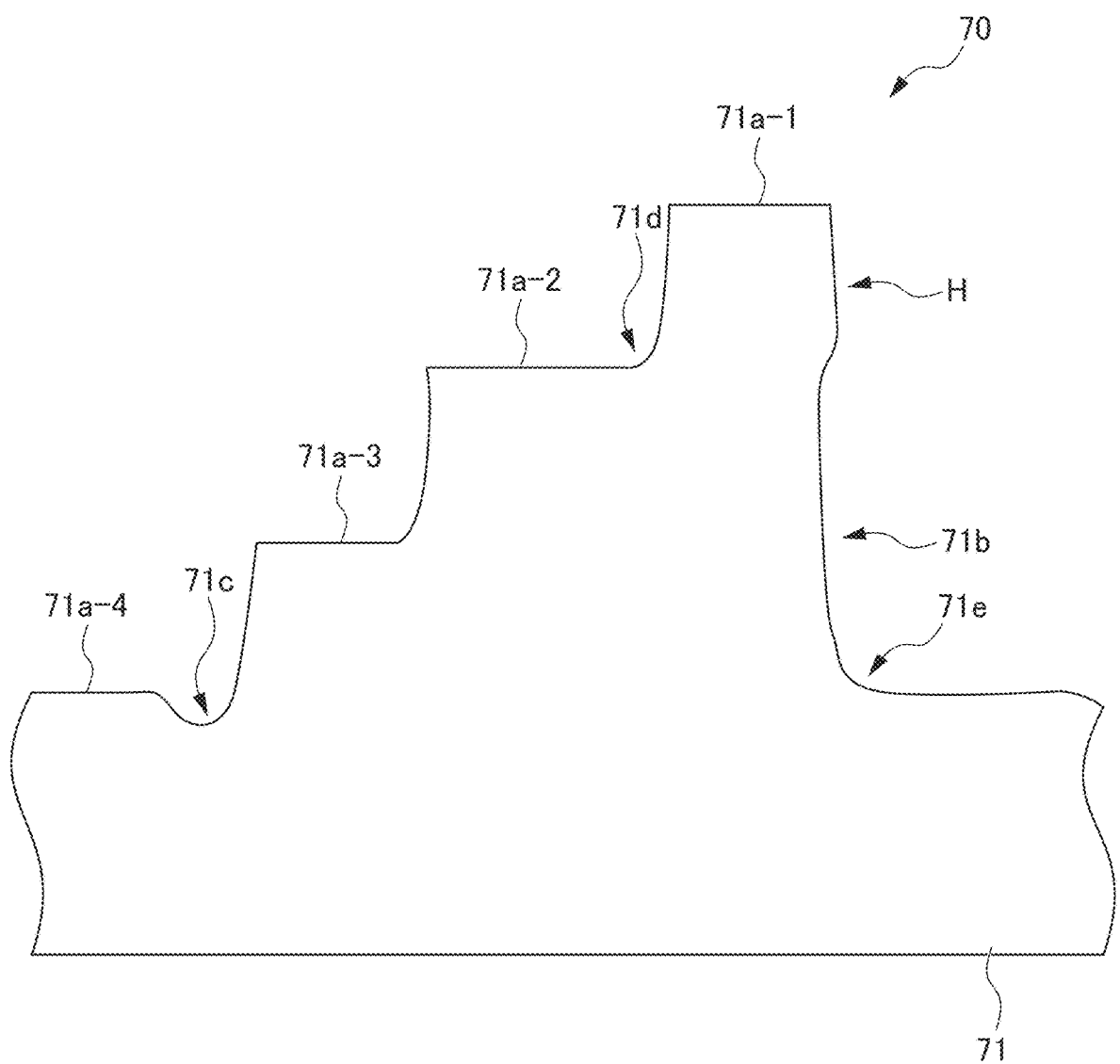

FIG. 19 is an enlarged view illustrating the protruding portion 71a.

The protruding portion 71a has a multistep shape including four step areas having different heights on one side (the left side in FIG. 19) of a cross-section. More specifically, the protruding portion 71a has a most protruding level-1 step area 71a-1, a level-2 step area 71a-2 which is by one step lower than the level-1 step area 71a-1, a level-3 step area 71a-3 which is by one step still lower than the level-2 step area 71a-2, and a level-4 step area 71a-4 which is by one step still lower than the level-3 step area 71a-3 on the one side.

In addition, another side (the right side in FIG. 19) of the cross-section opposite to the step area of the protruding portion 71a is provided with a constricted portion 71b depressed in an inward direction (the left side in FIG. 19) of the protruding portion 71a.

In addition, a depressed portion 71c formed to have a sectional shape depressed in a curved surface shape with a width smaller than the width of each step area is provided in a corner portion of the boundary between the level-3 step area 71a-3 and the level-4 step area 71a-4.

In addition, corner sections (inclined portions) 71d and 71e are provided at the corner portion of each step area.

Herein, a difference in optical characteristics that the diffractive optical element 70 of the fifth embodiment has will be described in comparison with the diffractive optical element 50 of Comparative Example which is configured in a typical stepped shape in the related art as illustrated in FIG. 11.

Figure 20:
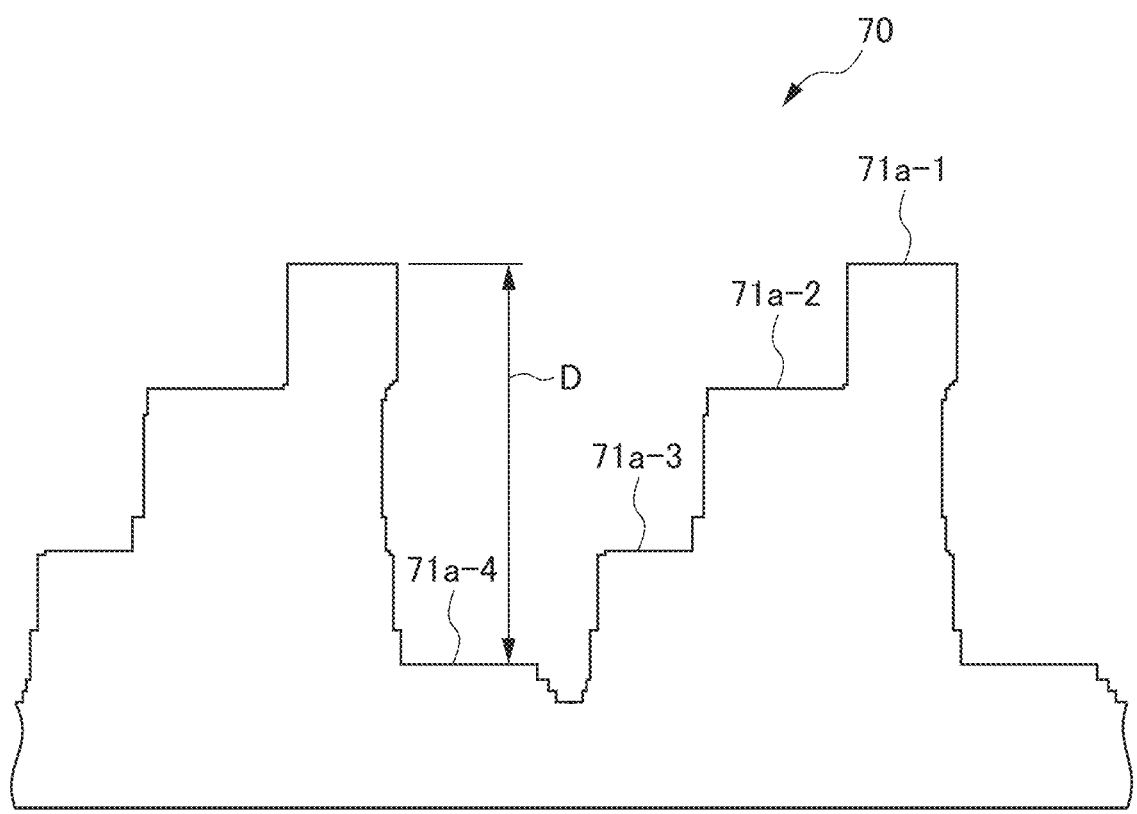
FIG. 20 is a view illustrating a shape of a calculation model for the diffractive optical element 70 of the fifth embodiment prepared for simulation.

FIG. 20 is a view illustrating a shape of a calculation model for the diffractive optical element 70 of the fifth embodiment prepared for simulation. An analytical simulation of diffraction efficiency was performed by using this shape and the shape of the diffractive optical element 50 of Comparative Example illustrated in FIG. 11.

In addition, a depth D of the diffractive optical element 70 illustrated in FIG. 20 corresponds to the depth up to the level-4 step area of the diffractive optical element 50 of Comparative Example.

Herein, calculation based on a rigorous coupled wave analysis (RCWA) theory was used for the analytical simulation of diffraction efficiency. The RCWA is reduced mathematically to solving eigenvalue problems of a matrix and linear equations, and thus, there is no difficulty in principle. In addition, the simulation results of electromagnetic field analysis based on RCWA and the reality basically agree with each other except for shape errors and the like in actual products.

In addition, the simulation was performed under the simulation conditions of the diffractive optical element 50 of Comparative Example as follows:

Wavelength $\lambda$: 850 nm
Refractive index n of the high refractive index part: 1.5
Refractive index of low refractive index part: 1.0
Pitch: 2000 nm to 4000 nm
Number P of levels in multiple step: 4

In addition, the ideal depth of the groove, which is constant regardless of the pitch, was set to a value obtained by the following expression:

1-step depth=$(P-1)/(P)\times$wavelength$/(n-1)$

P: number of levels
n: refractive index

In addition to the above conditions, the model in which the shape illustrated in FIG. 20 is incorporated is used as the conditions of the diffractive optical element 70 of this embodiment.

In addition, the depression amount of the constricted portion 71b was set to 1.6% of the pitch, and the depression amount of the depressed portion 71c was set to 2.7% of the pitch.

Figure 21:
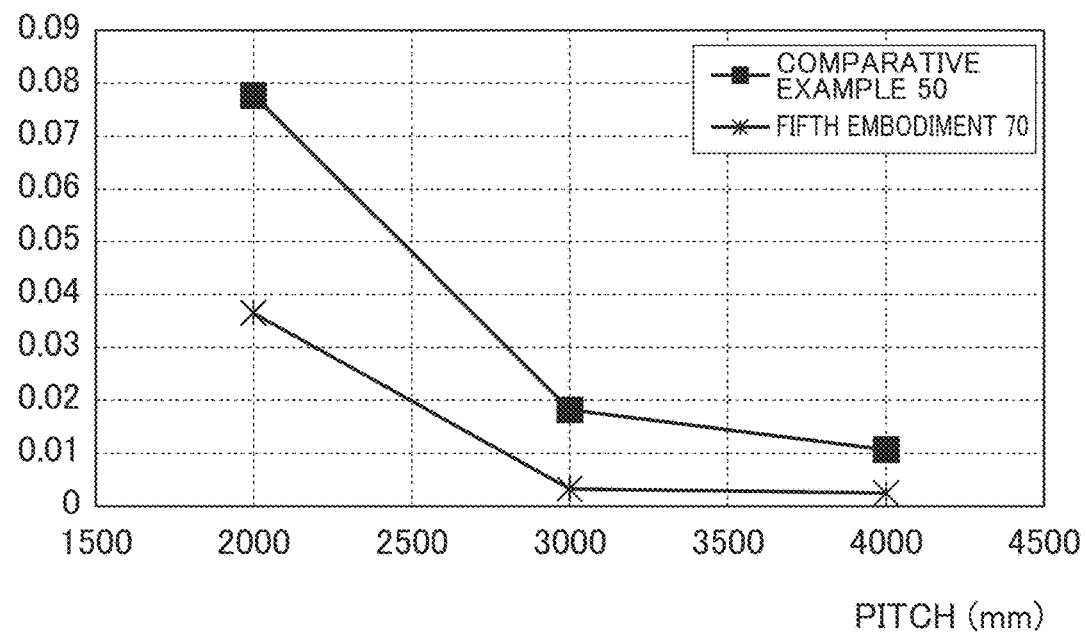
FIG. 21 is a view illustrating simulation results for the diffractive optical element 50 of Comparative Example and the diffractive optical element 70 of the fifth embodiment.

FIG. 21 is a view illustrating simulation results of the diffractive optical element 50 of Comparative Example and the diffractive optical element 70 of the fifth embodiment. FIG. 21 illustrates zeroth-order diffracted light intensity at an incidence angle of 0°.

In the diffractive optical element 70 of the fifth embodiment, the zeroth-order diffracted light intensity greatly decreases as compared with the diffractive optical element 50 of Comparative Example, and thus, very good results are obtained. It is considered that the effect of decreasing the intensity of the zeroth-order diffracted light is obtained as a result of introducing the constricted portion 71b and the depressed portion 71c.

Figure 22:
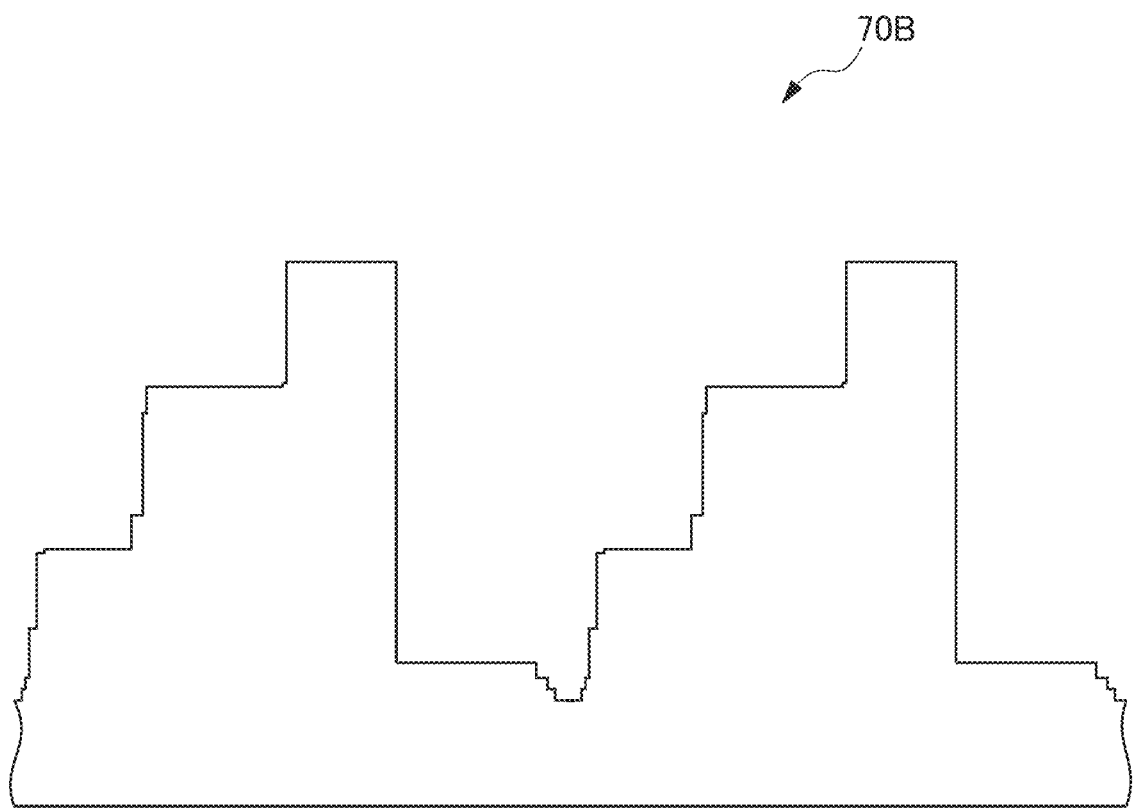
FIG. 22 is a view illustrating a model of a diffractive optical element 70B in which a constricted portion 71b is not formed.

FIG. 22 is a view illustrating a model of a diffractive optical element 70B in which a constricted portion 71b is not formed.

The simulation model of FIG. 22 is configured with a straight wall surface by removing the constricted portion 71b from the model of FIG. 20. In order to investigate the influence of the constricted portion 71b on the diffraction efficiency, a simulation was performed by using a model in FIG. 22 in which the constricted portion 71b was not formed.

Figure 23:
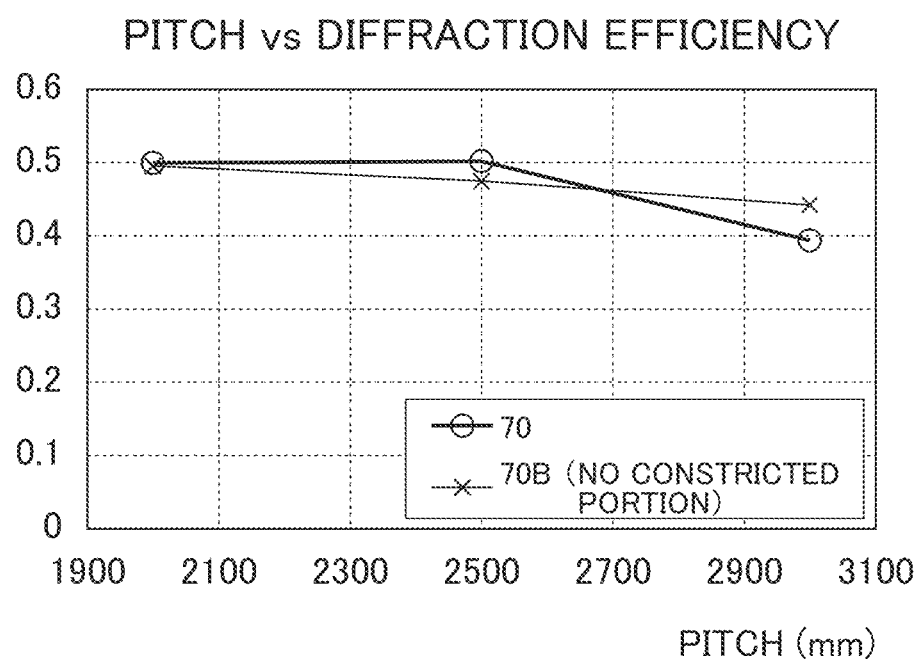
FIG. 23 is a view illustrating simulation results of diffraction efficiency for the diffractive optical element 70B in which the constricted portion 71b is not formed and the diffractive optical element 70 of the fifth embodiment.

FIG. 23 is a view illustrating a simulation result of the diffractive optical element 70B in which the constricted portion 71b is not formed, in addition to the simulation result of the diffractive optical element 70 of the fifth embodiment.

In the diffractive optical element 70 of the fifth embodiment, since the constricted portion 71b is provided, the diffraction efficiency is particularly high in the vicinity of 2,000 nm to 2,600 nm in pitch. Therefore, by providing the constricted portion 71b, it is possible to increase the diffraction efficiency particularly at a narrow pitch.

Figure 24:
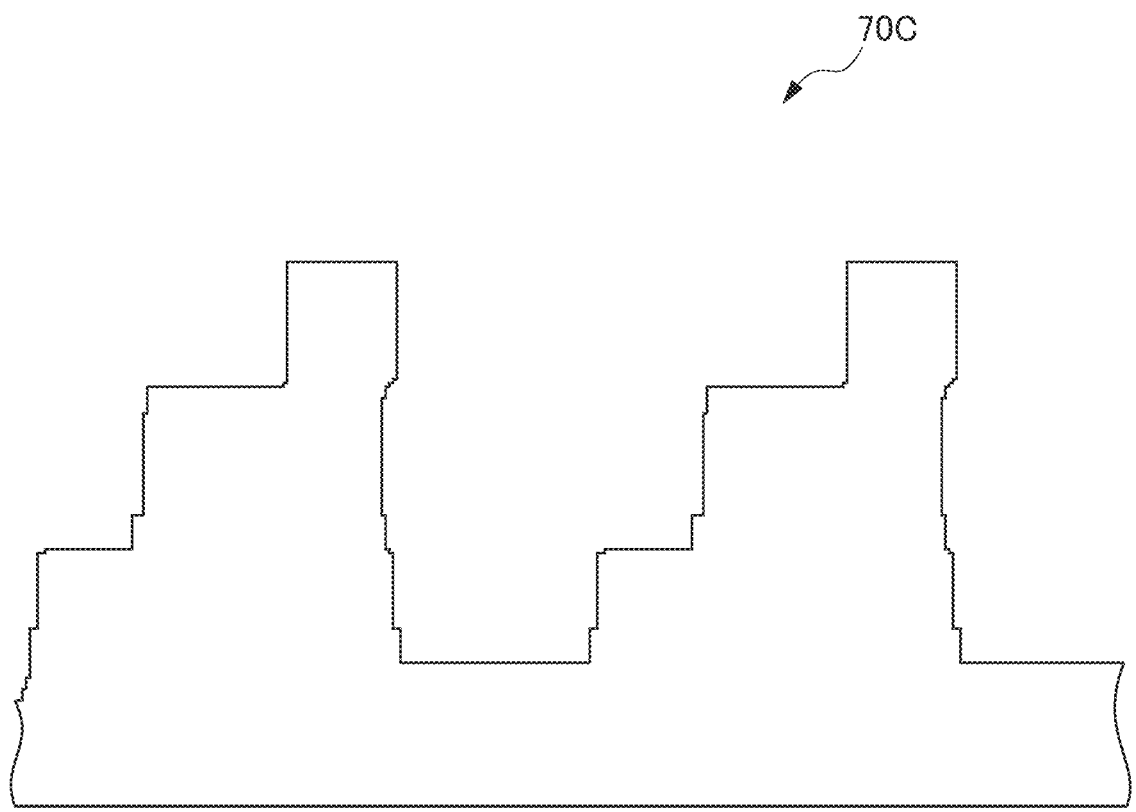
FIG. 24 is a view illustrating a model of a diffractive optical element 70C in which a depressed portion 71c is not formed.

FIG. 24 is a view illustrating a model of a diffractive optical element 70C in which a depressed portion 71c is not formed.

The simulation model of FIG. 24 is configured as a flat surface by removing the depressed portion 71c from the model of FIG. 20. In order to investigate the influence of the depressed portion 71c on oblique incident light, simulation was performed by using a model in which the depressed portion 71c illustrated in FIG. 24 was not formed.

Figure 25:
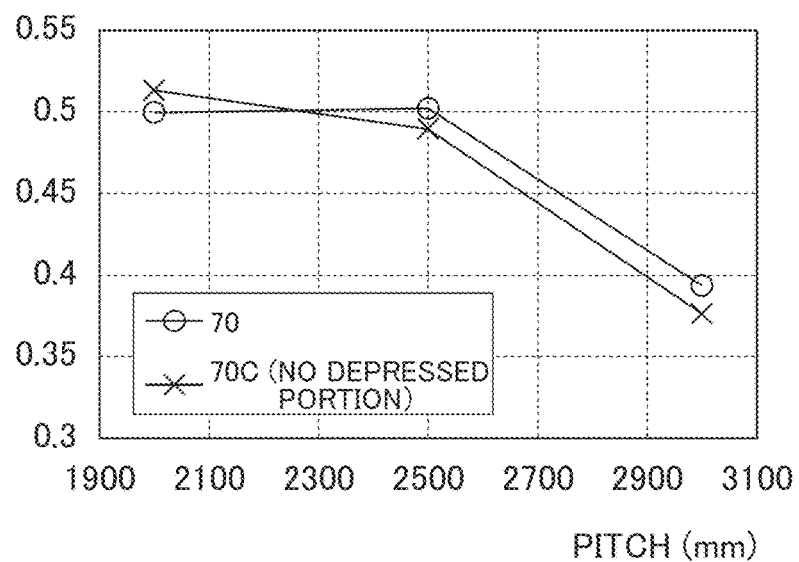
FIG. 25 is a view illustrating simulation results of the diffraction efficiency at 30° oblique incidence for the diffractive optical element 70C in which the depressed portion 71c is not formed and the diffractive optical element 70 of the fifth embodiment.

FIG. 25 is a view illustrating a simulation result of the diffractive optical element 70C in which the depressed portion 71c is not formed, in addition to the simulation result of the diffractive optical element 70 of the fifth embodiment, with respect to the diffraction efficiency at 30° oblique incidence.

In the diffractive optical element 70 of the fifth embodiment, since the depressed portion 71c is provided, the diffraction efficiency at 30° oblique incidence is particularly high in a configuration in which the pitch is 2300 nm or more. Therefore, when the depressed portion 71c is provided, it is possible to increase diffraction efficiency for oblique incidence, particularly, at a wide pitch.

Sixth Embodiment

Figure 26:
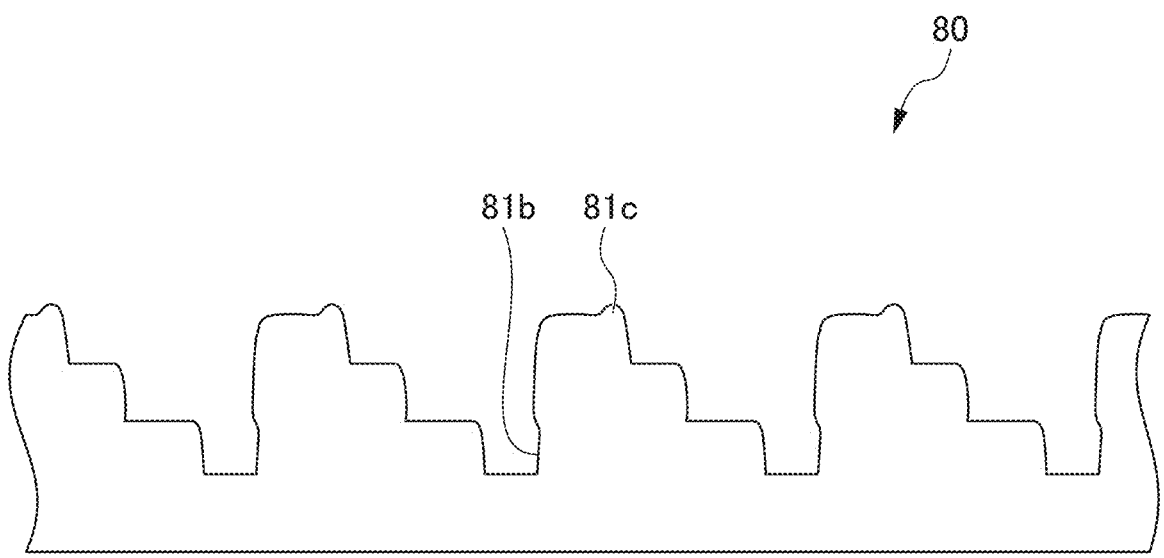
FIG. 26 is a view illustrating a diffractive optical element 80 of a sixth embodiment in a cross section similar to FIG. 3.

FIG. 26 is a view illustrating a diffractive optical element 80 of a sixth embodiment in a cross section similar to FIG. 3.

The diffractive optical element 80 of the sixth embodiment has a shape obtained by shape molding and inverting the diffractive optical element 70 of the fifth embodiment.

In the diffractive optical element 80 of the sixth embodiment, a constricted portion 81b and a protruding portion 81c are provided.

The diffractive optical element 80 of the sixth embodiment which is produced through molding and inversion of the diffractive optical element 70 of the fifth embodiment allows to obtain the same effect as that of the diffractive optical element 70 of the fifth embodiment.

Modified Embodiments

The present invention is not limited to the embodiments described above, various modifications and changes are possible, and these will be also within the scope of the present invention.

(1) In the first and second embodiment, the example in which, when viewed as the width of one step area, the width of the constricted portion in the portion where the second inclined portion and the third inclined portion are connected are approximately equal to or somewhat narrower than the distal end portion has been described. The present invention is not limited thereto, but for example, when viewed as the width of one step area, the width of the constricted portion in the portion where the second inclined portion and the third inclined portion are connected may be formed to be larger than a width of the distal end portion of the protruding portion.

(2) In each of the embodiments, the example in which the second inclined portion is connected to the first inclined portion has been described. The present invention is not limited thereto, but for example, a vertical portion extending in a direction perpendicular to the diffractive layer from the first inclined portion toward the base portion may be provided.

(3) In each of the embodiments, the diffractive optical element is illustrated as a simple form including only the high refractive index part. The present invention is not limited thereto, but for example, a transparent substrate for forming the high refractive index part may be provided, or a covering layer that covers the diffractive layer may be provided.

Figure 16A:
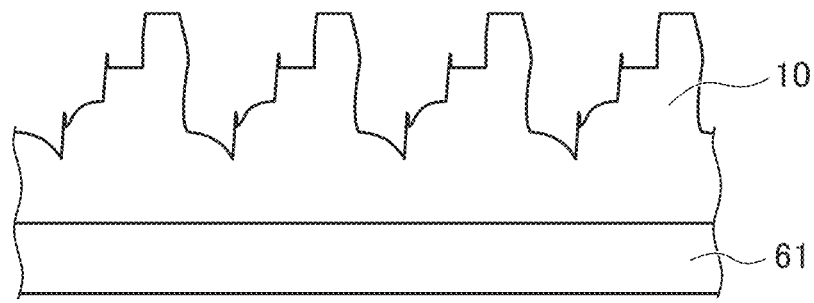
FIG. 16A is a view illustrating an example in which a transparent substrate is provided as a modified embodiment of the diffractive optical element.
Figure 16B:
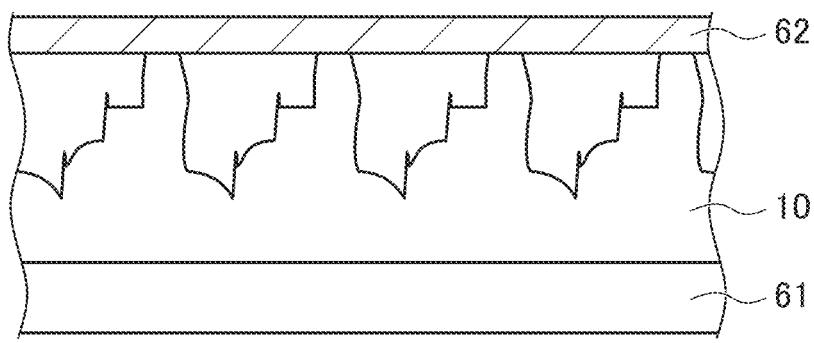
FIG. 16B is a view illustrating an example in which a transparent substrate and a covering layer are provided as a modified embodiment of the diffractive optical element.
Figure 16C:
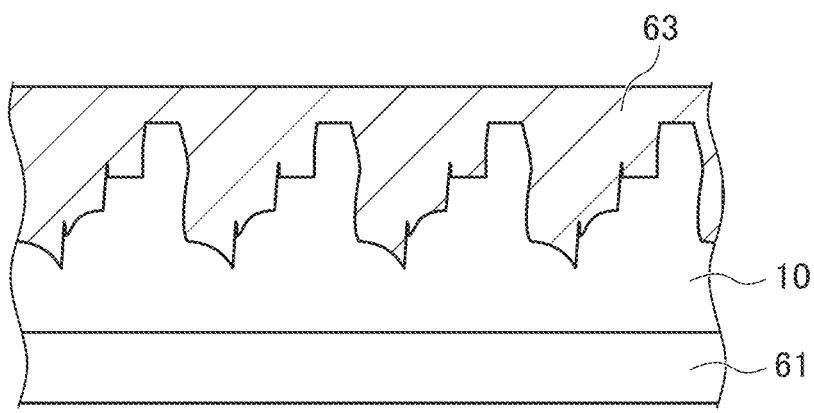
FIG. 16C is a view illustrating an example in which a transparent substrate and a covering layer are provided as a modified embodiment of the diffractive optical element.

FIG. 16A, FIG. 16B, and FIG. 16C are views illustrating an example in which a transparent substrate is provided and an example in which a covering layer is provided, as Modified embodiments of the diffractive optical element.

In FIG. 16A, the diffractive optical element 10 illustrated in the first embodiment is formed on a transparent substrate 61, and the whole is configured as a diffractive optical element. In this manner, by providing the transparent substrate 61, a manufacturing method using resin shaping can be used, and thus, it may be possible to easily perform manufacturing.

In FIG. 16B, in addition to the form of FIG. 16A, a covering layer 62 is directly stacked, and the whole is configured as a diffractive optical element. By adopting such a form, the covering layer 62 is provided and it may be possible to protect the convex shape.

In FIG. 16C, in addition to the form of FIG. 16A, a covering layer 63 is formed with a transparent resin that enters into the recessed section, and the whole is configured as a diffractive optical element. In this case, a resin having a refractive index lower than that of the high refractive index part is used for the transparent resin forming the covering layer 63 in order to obtain the low refractive index part. By adopting such a form, it may be possible to protect the convex shape effectively.

(4) In each of the embodiments, an example of the diffractive optical element designed to diffract an infrared laser beam having a wavelength of 980 nm has been described. The present invention is not limited thereto, but for example, the diffractive optical element may be one that diffracts infrared rays having a wavelength of 780 nm or more. The present invention may also be applied to a diffractive optical element that diffracts light having any wavelength such as visible light, not limited to the infrared rays.

(5) In each of the embodiments, an example of the light irradiation device in which the light source emits an infrared laser beam having a wavelength of 980 nm has been described. The present invention is not limited thereto, but for example, the light source may be one that emits infrared rays having a wavelength of 780 nm or more. A light source that emits light having any wavelength may also be applied to a light irradiation device in which a light source emits visible light, not limited to the infrared rays.

In addition, the first to fourth embodiments and Modified Example may be used in appropriate combination, but the detailed description will be omitted. In addition, the present invention is not limited by each of the embodiments described above.

EXPLANATION OF REFERENCE NUMERALS

10 DIFFRACTIVE OPTICAL ELEMENT
11 HIGH REFRACTIVE INDEX PART

11a PROTRUDING PORTION
11a-1 LEVEL-1 STEP AREA
11a-2 LEVEL-2 STEP AREA
11a-3 LEVEL-3 STEP AREA
11a-4 LEVEL-4 STEP AREA
11b FIRST INCLINED PORTION
11c SECOND INCLINED PORTION
11d THIRD INCLINED PORTION
11e DISTAL END PORTION
11f BASE PORTION
11g ACUTE ANGLE PORTION
11h ACUTE ANGLE PORTION
11i ACUTE ANGLE PORTION
11j RIDGE
11k RIDGE
11m WALL PORTION
11n WALL PORTION
11o WALL PORTION
12 RECESSED SECTION
13 SPACE
14 LOW REFRACTIVE INDEX PART
15 DIFFRACTIVE LAYER
20 DIFFRACTIVE OPTICAL ELEMENT
21 HIGH REFRACTIVE INDEX PART
21a PROTRUDING PORTION
21a-1 LEVEL-1 STEP AREA
21a-2 LEVEL-2 STEP AREA
21a-3 LEVEL-3 STEP AREA
21a-4 LEVEL-4 STEP AREA
21b FIRST INCLINED PORTION
21c SECOND INCLINED PORTION
21d THIRD INCLINED PORTION
21e DISTAL END PORTION
21f BASE PORTION
21g ACUTE ANGLE PORTION
21h ACUTE ANGLE PORTION
21i ACUTE ANGLE PORTION
21j DISTAL END PORTION
21m WALL PORTION
21n WALL PORTION
21o WALL PORTION
25 DIFFRACTIVE LAYER
30 DIFFRACTIVE OPTICAL ELEMENT
31 HIGH REFRACTIVE INDEX PART
31a PROTRUDING PORTION
31a-1 LEVEL-1 STEP AREA
31a-2 LEVEL-2 STEP AREA
31a-3 LEVEL-3 STEP AREA
31a-4 LEVEL-4 STEP AREA
31b FIRST INCLINED PORTION
31c SECOND INCLINED PORTION
31d THIRD INCLINED PORTION
31e DISTAL END PORTION
31f BASE PORTION
31i ACUTE ANGLE PORTION
31j RIDGE
31k RIDGE
31m WALL PORTION
31n WALL PORTION
31o WALL PORTION
35 DIFFRACTIVE LAYER
40 DIFFRACTIVE OPTICAL ELEMENT
41 HIGH REFRACTIVE INDEX PART
41a PROTRUDING PORTION
41a-1 LEVEL-1 STEP AREA
41a-2 LEVEL-2 STEP AREA
41a-3 LEVEL-3 STEP AREA
41a-4 LEVEL-4 STEP AREA
41b FIRST INCLINED PORTION
41c SECOND INCLINED PORTION
41d THIRD INCLINED PORTION
41e DISTAL END PORTION
41f BASE PORTION
41i ACUTE ANGLE PORTION
41k RIDGE
41m WALL PORTION
41n WALL PORTION
41o WALL PORTION
45 DIFFRACTIVE LAYER
50 DIFFRACTIVE OPTICAL ELEMENT
61 TRANSPARENT SUBSTRATE
62 COVERING LAYER
63 COVERING LAYER
70 DIFFRACTIVE OPTICAL ELEMENT
71b CONSTRICTED PORTION
71c DEPRESSED PORTION
80 DIFFRACTIVE OPTICAL ELEMENT
81b CONSTRICTED PORTION
81c DEPRESSED PORTION
200 SCREEN
201 LIGHT
202 IRRADIATION AREA
204 IRRADIATION AREA
CAM1 INFRARED CAMERA
CAM2 INFRARED CAMERA
L LIGHT SOURCE
P FLAT PLANE
S SCREEN

The invention claimed is:

1. A diffractive optical element for shaping light, comprising a diffractive layer including:
a high refractive index part in which a plurality of protruding portions are arranged side by side in a sectional view; and
a low refractive index part configured to have a recessed section formed at least between the protruding portions,
a refractive index of the recessed section configured to be lower than a refractive index of the high refractive index part,
wherein each protruding portion is configured to have a multistep shape including a plurality of step areas having different heights from each other on at least one side of a cross-section of each protruding portion, and
wherein at least a portion of the cross-section of each protruding portion is configured to include an inclined portion inclined with respect to a plane including the diffractive layer.

2. The diffractive optical element according to claim 1, wherein the cross-section of each protruding portion includes a first inclined portion that is configured to incline in a direction in which a width of each protruding portion increases from a distal end portion toward a base portion of each protruding portion.

3. The diffractive optical element according to claim 2, further comprising:
a vertical portion extending in a direction perpendicular to the diffractive layer from the first inclined portion toward the base portion.

4. The diffractive optical element according to claim 2, further comprising:
a second inclined portion configured to incline in a direction in which the width of each protruding portion decreases from the first inclined portion toward the base portion; and a third inclined portion configured to incline in a direction in which the width of each protruding portion increases from the second inclined portion toward the base portion.

5. The diffractive optical element according to claim 4, wherein a width of a constricted portion where the second inclined portion and the third inclined portion are connected to each other is larger than a width of a top portion of the step area when viewed as a width of one step area.

6. The diffractive optical element according to claim 1, wherein the cross-section of each protruding portion includes a constricted portion of which a portion is configured to dent in an inward direction of each protruding portion.

7. A diffractive optical element for shaping light, comprising a diffractive layer including:
   a high refractive index part in which a plurality of protruding portions are arranged side by side in a sectional view; and
   a low refractive index part configured to have a recessed section formed at least between the protruding portions, a refractive index of the recessed section configured to be lower than a refractive index of the high refractive index part,
   wherein each protruding portion is configured to have a multistep shape including a plurality of step areas having different heights from each other on at least one side of a cross-section of each protruding portion, and
   wherein the cross-section of each protruding portion includes a constricted portion of which a portion is configured to dent in an inward direction of each protruding portion.

8. The diffractive optical element according to claim 6, wherein a width of the constricted portion is ½ or more of a width of a top portion of the step area when viewed as a width of one step area.

9. The diffractive optical element according to claim 1, wherein at least one of ridges of the multistep shape is configured to incline smoothly.

10. The diffractive optical element according to claim 1, further comprising:
    an acute angle portion having a sectional shape protruding at an acute angle or having a sectional shape formed to dent at an acute angle with a width smaller than a width of each step area in at least one of boundaries of adjacent step areas of the multistep shape.

11. The diffractive optical element according to claim 1, further comprising:
    a protruding portion having a sectional shape protruding in a curved shape or a depressed portion having a sectional shape formed to dent in a curved shape with a width smaller than a width of each step area in at least one of boundaries between adjacent step areas of the multistep shape.

12. The diffractive optical element according to claim 1, wherein the high refractive index part comprises a cured ionizing radiation curable resin composition.

13. The diffractive optical element according to claim 1, wherein the low refractive index part comprises air.

14. The diffractive optical element according to claim 1, wherein a transparent substrate, the diffractive layer, and a covering layer covering the diffractive layer are stacked in this order.

15. The diffractive optical element according to claim 1, wherein the diffractive layer is configured to diffract infrared rays having a wavelength of 780 nm or more.

16. The diffractive optical element according to claim 15, wherein a height of the protruding portion is 650 nm or more.

17. A light irradiation device comprising:
    a light source; and
    at least one diffractive optical element according to claim 1, which is arranged at a position through which light emitted by the light source passes.

18. The light irradiation device according to claim 17, wherein the light source is configured to emit infrared rays having a wavelength of 780 nm or more.

* * * * *